(12) United States Patent
Itamiya et al.

(10) Patent No.: US 8,185,159 B2
(45) Date of Patent: *May 22, 2012

(54) WIRELESS COMMUNICATION SYSTEM

(75) Inventors: Takashi Itamiya, Yokohama (JP);
Shigeyasu Kubo, Chigasaki (JP);
Akihiko Yoshida, Yokohama (JP);
Yosuke Takahashi, Yokohama (JP);
Nobuo Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 12/752,713

(22) Filed: Apr. 1, 2010

(65) Prior Publication Data
US 2010/0255840 A1 Oct. 7, 2010

(30) Foreign Application Priority Data

Apr. 3, 2009 (JP) .................................. 2009-090644

(51) Int. Cl.
*H04M 1/00* (2006.01)
*H04B 1/38* (2006.01)

(52) U.S. Cl. ...................... 455/561; 455/435.1; 455/433; 455/458

(58) Field of Classification Search .......................... None
See application file for complete search history.

(56) References Cited

U.S. PATENT DOCUMENTS

| | | | | |
|---|---|---|---|---|
| 2009/0270111 A1* | 10/2009 | Nakamura et al. | ......... | 455/456.1 |
| 2010/0184432 A1* | 7/2010 | Yano et al. | ................. | 455/435.1 |
| 2010/0255841 A1* | 10/2010 | Kubo et al. | ................ | 455/435.1 |

FOREIGN PATENT DOCUMENTS

| | | |
|---|---|---|
| JP | 09-027985 | 1/1997 |
| JP | 2008-211335 | 8/2006 |
| JP | 2008-193261 | 8/2008 |

OTHER PUBLICATIONS

3GPP TS 24.301 V1.0.0, §5.5.3, $3^{rd}$ Generation Partnership Project; Technical Specification Group Core Network and Terminal; Non-Access-Stratum (NAS) protocol for Evolved Packet System (EPS); Stage 3, 2008.

3GPP TS 23.401 V8.3.0, §5.3.3, $3^{rd}$ Generation Partnership Project; Technical Specification Group Services and System Aspects; General Packet Radio Service (GPRS) Enhancements for Evolved Universal Terrestrial Radio Access Network (E-UTRAN) access (Release 8), 2008.

* cited by examiner

*Primary Examiner* — Ajit Patel
(74) *Attorney, Agent, or Firm* — Brundidge & Stanger, P.C.

(57) ABSTRACT

A wireless communication system including a wireless terminal, a plurality of base stations and a call processing control unit is disclosed. The wireless terminal, upon reception of the notification information from any of the base stations, judges whether the area included in the notification information is contained in the location registration area list stored in a storage unit, and in the case where the particular area is not so contained, sends a location registration request to the call processing control unit. On the other hand, the call processing control unit creates a new location registration area list based on the area included in the notification information and the neighboring areas, and sends the location registration area list to the wireless terminal thereby to execute the paging process.

8 Claims, 25 Drawing Sheets

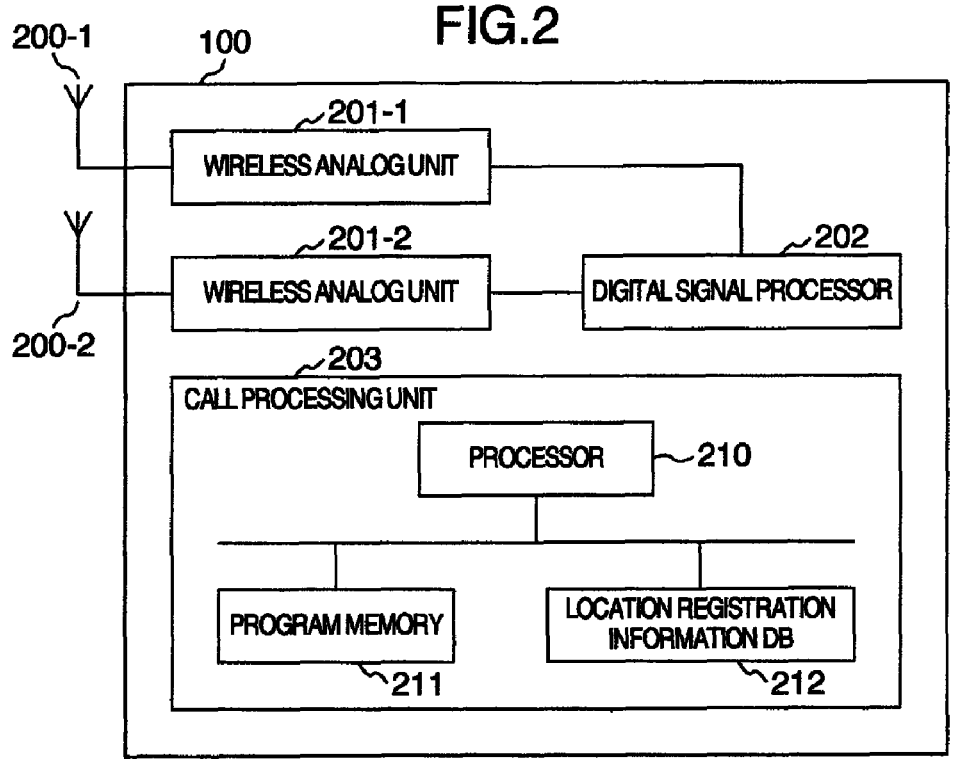
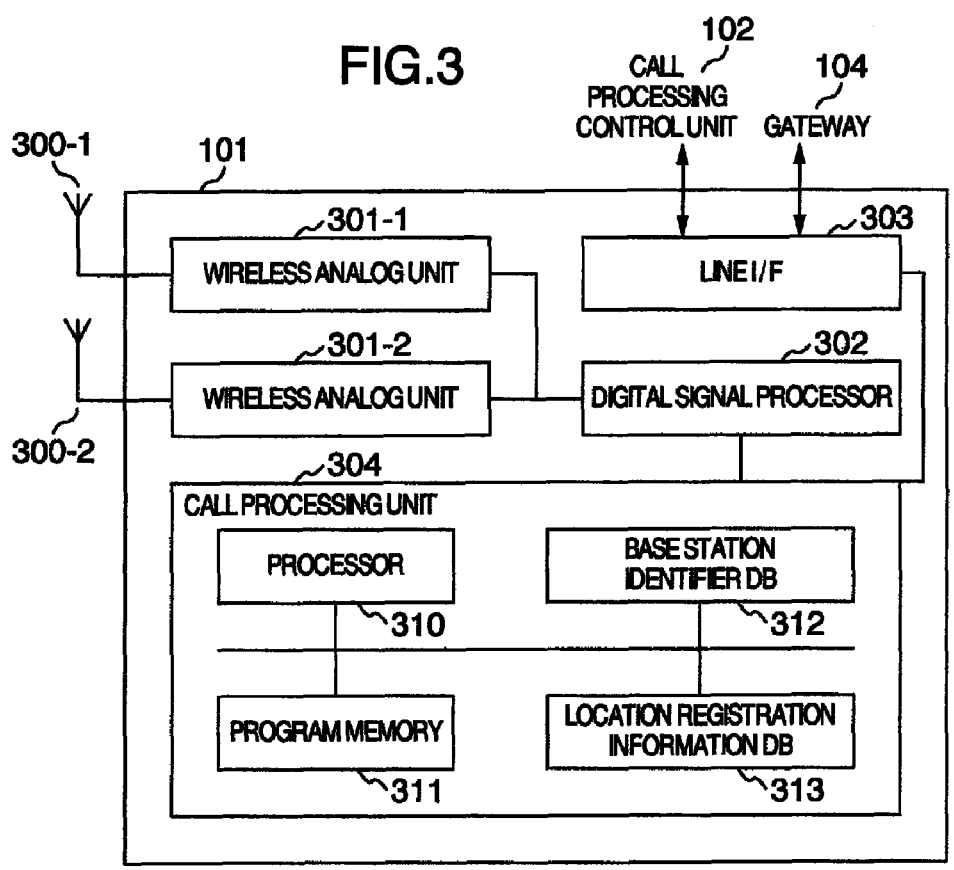

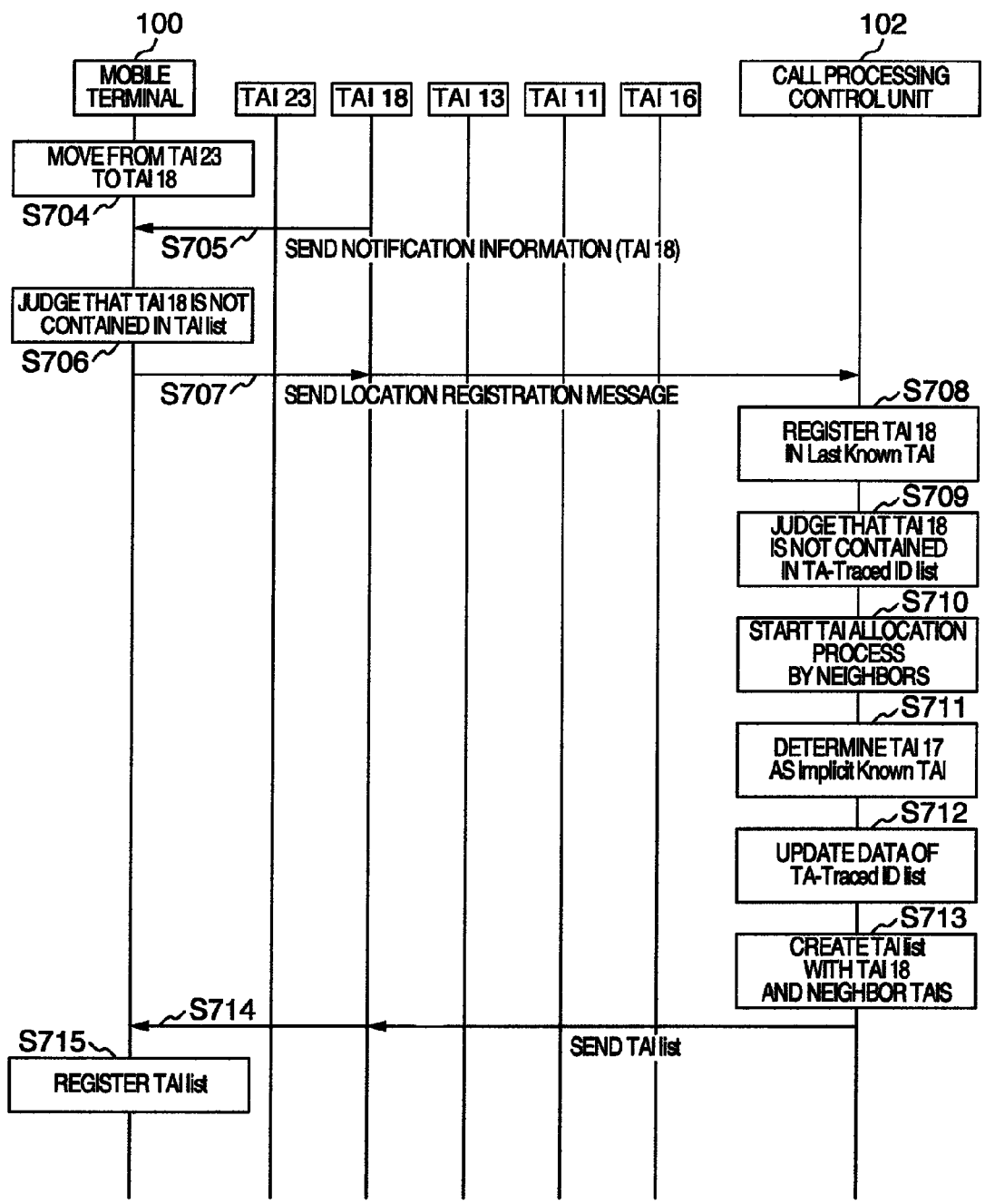

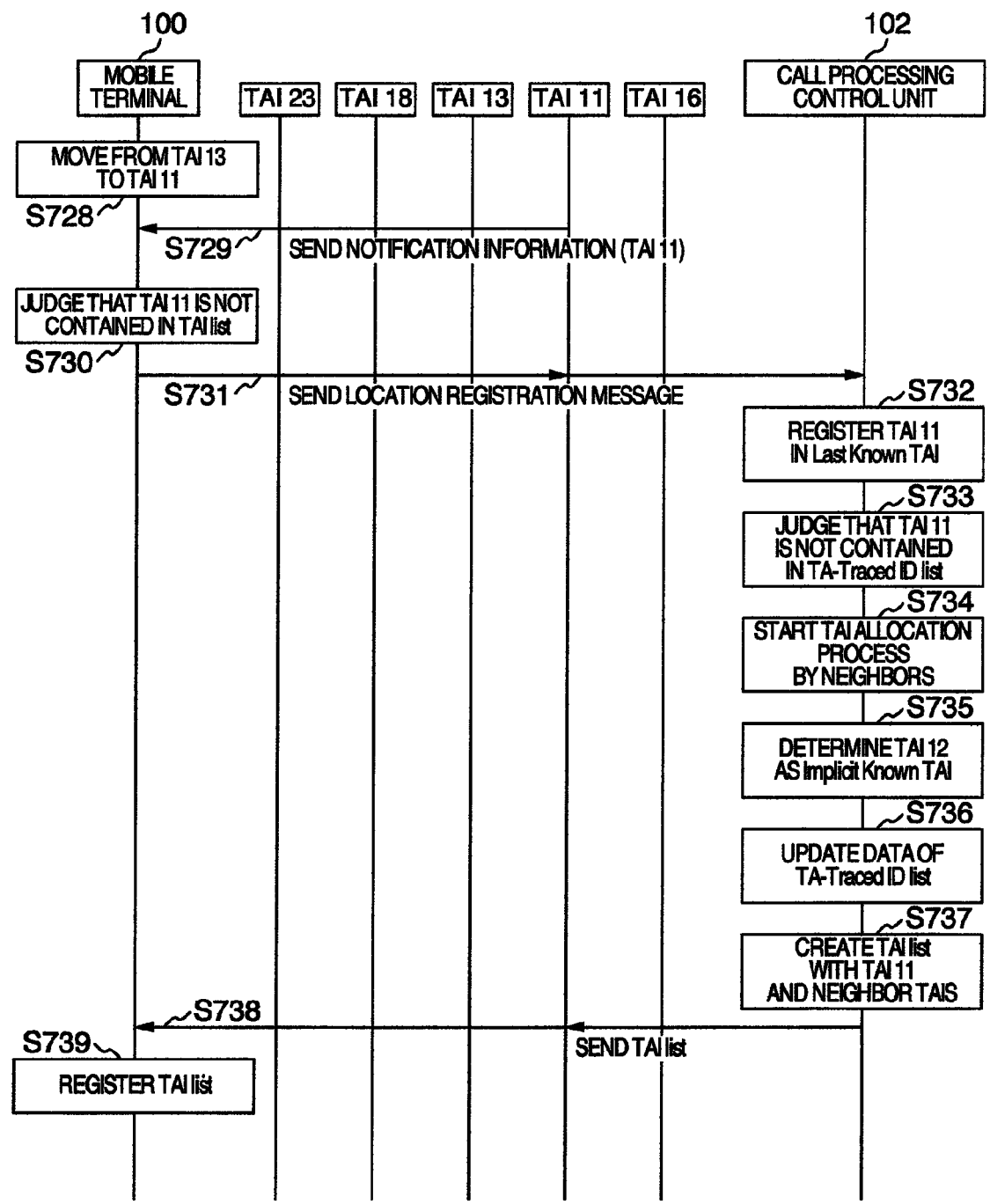

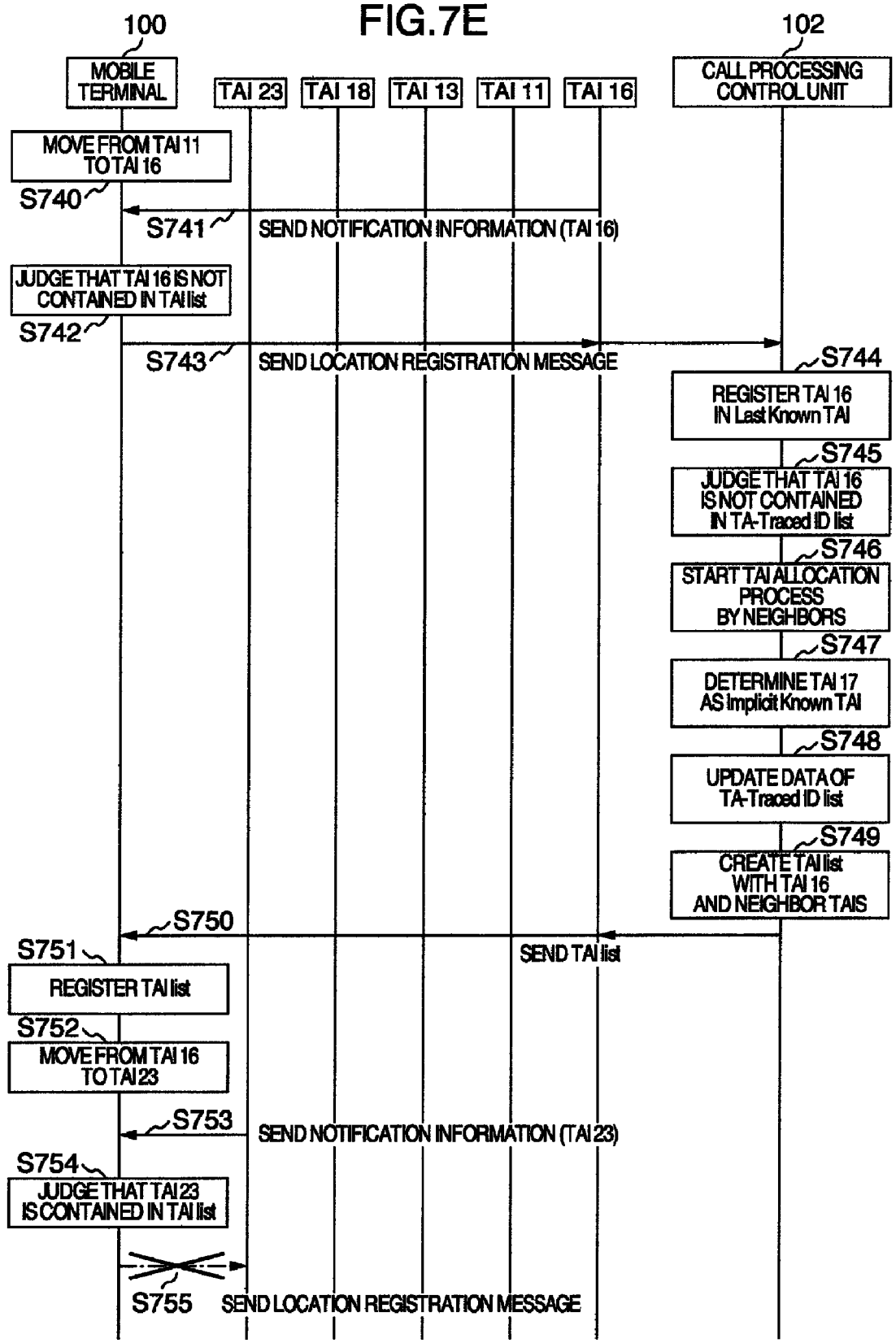

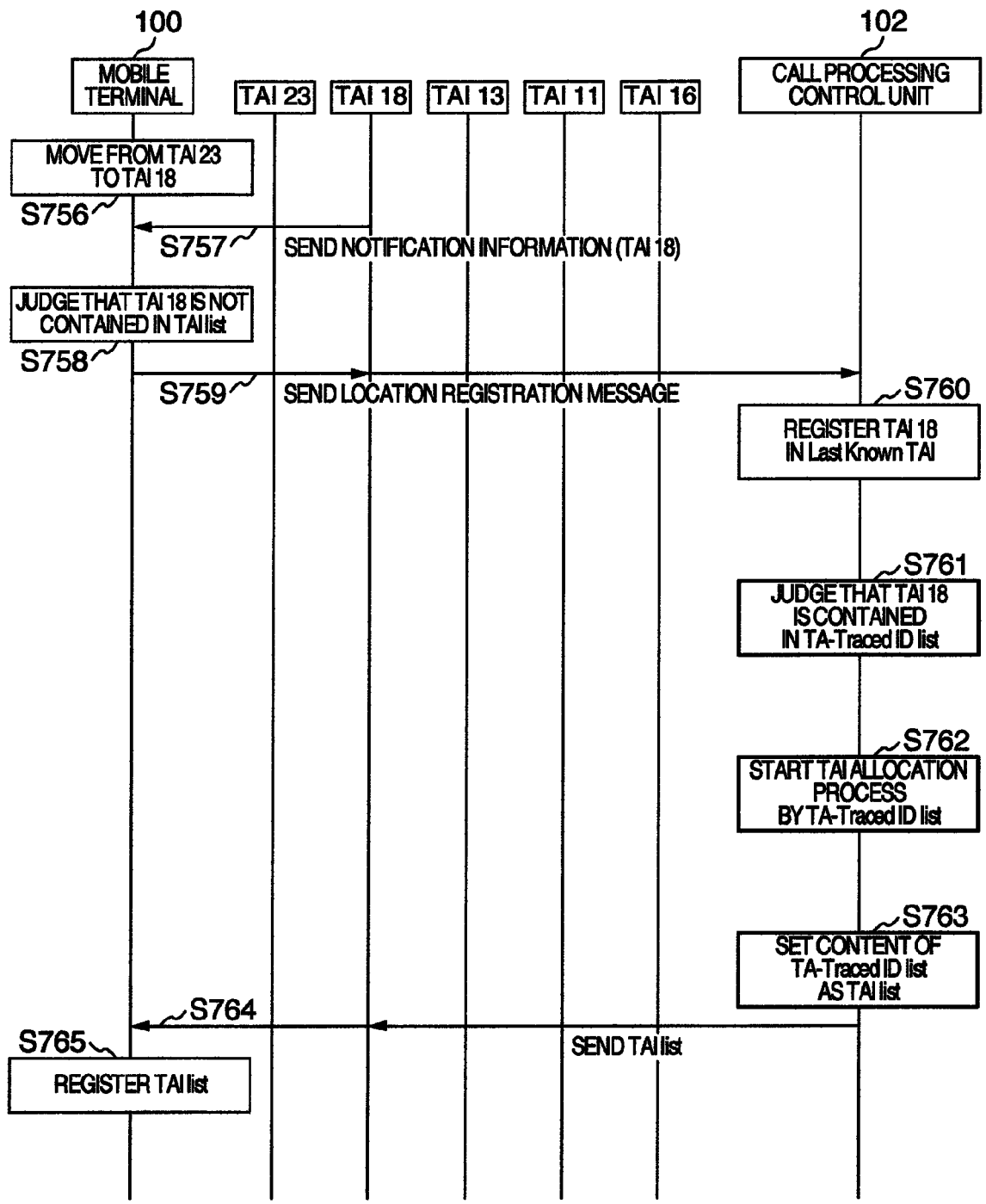

| LOCATION REGISTRATION INFORMATION DB OF CALL PROCESSING CONTROL UNIT | |
|---|---|
| Last Visited Registered TAI | NULL |
| Implicit Known TAI | NULL |
| Last Known TAI | TAI 23 |
| TA Traced ID list | NULL |
| TA list | TAI 15,16,17,22,23,24,29,30,31 |
| | |
| LOCATION REGISTRATION INFORMATION DB OF MOBILE TERMINAL | |
| Last Visited Registered TAI | NULL → TAI 23 |
| TA list | TAI 15,16,17,22,23,24,29,30,31 |

| LOCATION REGISTRATION INFORMATION DB OF CALL PROCESSING CONTROL UNIT | |
|---|---|
| Last Visited Registered TAI | TAI 23 |
| Implicit Known TAI | TAI 17 |
| Last Known TAI | TAI 18 |
| TA Traced ID list | TAI 17,18,23 |
| TA list | TAI 10,11,12,17,18,19,24,25,26 |
| | |
| LOCATION REGISTRATION INFORMATION DB OF MOBILE TERMINAL | |
| Last Visited Registered TAI | TAI 23 → TAI 18 |
| TA list | TAI 10,11,12,17,18,19,24,25,26 |

| LOCATION REGISTRATION INFORMATION DB OF CALL PROCESSING CONTROL UNIT | |
|---|---|
| Last Visited Registered TAI | TAI 18 |
| Implicit Known TAI | TAI 12 |
| Last Known TAI | TAI 13 |
| TA Traced ID list | TAI 12,13,17,18,23 |
| TA list | TAI 5,6,7,12,13,14,19,20,21 |
| | |
| LOCATION REGISTRATION INFORMATION DB OF MOBILE TERMINAL | |
| Last Visited Registered TAI | TAI 18 → TAI 13 |
| TA list | TAI 5,6,7,12,13,14,19,20,21 |

| LOCATION REGISTRATION INFORMATION DB OF CALL PROCESSING CONTROL UNIT ||
|---|---|
| Last Visited Registered TAI | TAI 13 |
| Implicit Known TAI | TAI 12 |
| Last Known TAI | TAI 11 |
| TA Traced ID list | TAI 11,12,13,17,18,23 |
| TA list | TAI 3,4,5,10,11,12,17,18,19 |
| | |
| LOCATION REGISTRATION INFORMATION DB OF MOBILE TERMINAL ||
| Last Visited Registered TAI | TAI 13 → TAI 11 |
| TA list | TAI 3,4,5,10,11,12,17,18,19 |

| LOCATION REGISTRATION INFORMATION DB OF CALL PROCESSING CONTROL UNIT | |
|---|---|
| Last Visited Registered TAI | TAI 11 |
| Implicit Known TAI | TAI 17 |
| Last Known TAI | TAI 16 |
| TA Traced ID list | TAI 11,12,13,16,17,18,23 |
| TA list | TAI 8,9,10,15,16,17,22,23,24 |
| | |
| LOCATION REGISTRATION INFORMATION DB OF MOBILE TERMINAL | |
| Last Visited Registered TAI | TAI 11 → TAI 23 |
| TA list | TAI 8,9,10,15,16,17,22,23,24 |

| LOCATION REGISTRATION INFORMATION DB OF CALL PROCESSING CONTROL UNIT | |
|---|---|
| Last Visited Registered TAI | TAI 23 |
| Implicit Known TAI | NULL |
| Last Known TAI | TAI 18 |
| TA Traced ID list | TAI 11,12,13,16,17,18,23 |
| TA list | TAI 11,12,13,16,17,18,23 |
| | |
| LOCATION REGISTRATION INFORMATION DB OF MOBILE TERMINAL | |
| Last Visited Registered TAI | TAI 23 → TAI 18 |
| TA list | TAI 11,12,13,16,17,18,23 |

| LOCATION REGISTRATION INFORMATION DB OF CALL PROCESSING CONTROL UNIT | |
|---|---|
| Last Visited Registered TAI | TAI 18 |
| Implicit Known TAI | NULL |
| Last Known TAI | TAI 19 |
| TA Traced ID list | TAI 11,12,13,16,17,18,23 |
| TA list | TAI 11,12,13,18,19,20,25,26,27 |
| | |
| LOCATION REGISTRATION INFORMATION DB OF MOBILE TERMINAL | |
| Last Visited Registered TAI | TAI 23 → TAI 18 |
| TA list | TAI 11,12,13,18,19,20,25,26,27 |

FIG.12

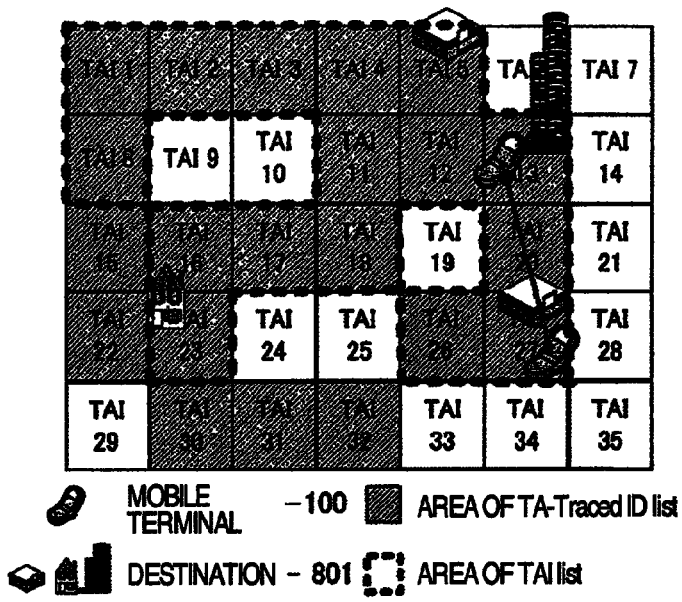

| | |
|---|---|
| 🔑 | MOBILE TERMINAL −100 |
| 📦🏢 | DESTINATION − 801 |
| ▨ | AREA OF TA-Traced ID list |
| ⬚ | AREA OF TAI list |

| LOCATION REGISTRATION INFORMATION DB OF CALL PROCESSING CONTROL UNIT | |
|---|---|
| Last Visited Registered TAI | TAI 27 |
| Implicit Known TAI | NULL |
| Last Known TAI | TAI 13 |
| TA Traced ID list | TAI 1,2,3,4,5,8,11,12,13,15,16,17,18, 20,22,23,26,27,30,31,32 |
| TA list | TAI 1,2,3,4,5,8,11,12,13,16,17,18,20, 23,26,27 |
| | |
| LOCATION REGISTRATION INFORMATION DB OF MOBILE TERMINAL | |
| Last Visited Registered TAI | TAI 27 → TAI 13 |
| TA list | TAI 1,2,3,4,5,8,11,12,13,16,17,18,20, 23,26,27 |

| LOCATION REGISTRATION INFORMATION DB OF CALL PROCESSING CONTROL UNIT ||
|---|---|
| Last Visited Registered TAI | NULL |
| Implicit Known TAI | NULL |
| Last Known TAI | TAI 23 |
| TA Traced ID list | NULL |
| TA list | TAI 15,16,17,22,23,24,29,30,31 |

| LOCATION REGISTRATION INFORMATION DB OF MOBILE TERMINAL ||
|---|---|
| Last Visited Registered TAI | NULL → TAI 23 |
| TA list | TAI 15,16,17,22,23,24,29,30,31 |

| LOCATION REGISTRATION INFORMATION DB OF CALL PROCESSING CONTROL UNIT | |
|---|---|
| Last Visited Registered TAI | TAI 23 |
| Implicit Known TAI | TAI 17 |
| Last Known TAI | TAI 18 |
| TA Traced ID list | TAI 17,18,23 |
| TA list | TAI 10,11,12,17,18,19,24,25,26 |
| | |
| LOCATION REGISTRATION INFORMATION DB OF MOBILE TERMINAL | |
| Last Visited Registered TAI | TAI 23 → TAI 18 |
| TA list | TAI 10,11,12,17,18,19,24,25,26 |

| LOCATION REGISTRATION INFORMATION DB OF CALL PROCESSING CONTROL UNIT | |
|---|---|
| Last Visited Registered TAI | TAI 23 |
| Implicit Known TAI | NULL |
| Last Known TAI | TAI 18 |
| TA Traced ID list | TAI 11,12,13,16,17,18,23 |
| TA list | TAI 11,12,13,16,17,18,23 |
| | |
| LOCATION REGISTRATION INFORMATION DB OF MOBILE TERMINAL | |
| Last Visited Registered TAI | TAI 23 → TAI 18 |
| TA list | TAI 11,12,13,16,17,18,23 |

WIRELESS COMMUNICATION SYSTEM

INCORPORATION BY REFERENCE

The present application claims priority from Japanese application JP2009-090644 filed on Apr. 3, 2009, the content of which is hereby incorporated by reference into this application.

BACKGROUND OF THE INVENTION

This invention relates to a technique for paging to a mobile terminal in a wireless communication system in which the location registration area required for location registration is set automatically.

The problem in a mobile communication system is how to suppress the battery consumption of the mobile terminal. In order to suppress the battery consumption, the mobile terminal moves in a state (standby mode) with the communication disconnected with the base stations while not in data communication. In the case where the data terminates at a mobile terminal in standby mode, the mobile communication system, not informed of the location of the mobile terminal, is required to send the call signal from a plurality of base stations. The transmission of a call signal from a multiplicity of base stations in response to the data termination at a single mobile terminal is the waste of the wireless resources. In order to suppress the waste of the wireless resources due to the call signal, a technique called the location registration to specify a certain range of base stations associated with the mobile terminal is disclosed in 3GPP (3rd generation partnership project) 3GPP TS 24. 301 V1.0.0 and 3GPP (3rd generation partnership project) 3GPP TS 23. 401 V8.3.0. which are standard documents describing the technical specifications in LTE (Long Term Evolution) system providing the 3.9-generation wireless communication technology.

These documents 3GPP (3rd generation partnership project) 3GPP TS 24. 301 V1.0.0 and 3GPP (3rd generation partnership project) 3GPP TS 23. 401 V8.3.0. describe a location registration method using a location registration area called the tracking area (TA) configured of a plurality of base stations. A call processing control unit discriminates the TA with an area identifier called TAI (Tracking Area Identity). TAI is allocated to all the base stations, and the same value of TAI may be allocated to a plurality of base stations. The area in which a mobile terminal exists is managed by TAI. In the case where a mobile terminal is managed in one TAI area, however, the call page message is sent to only one TAI area, and therefore, the consumption of the wireless resources used for the incoming call can be suppressed. The management of a mobile terminal in one TAI area, however, requires the location registration each time the mobile terminal moves to the area of a different TAI, resulting in an increased consumption of the wireless resources due to the location registration process.

A method to suppress the increased consumption of the wireless resources due to the location registration process by managing the mobile terminal using a location registration area identifier list (TAI list) containing a plurality of TAIs is described in 3GPP (3rd generation partnership project) 3GPP TS 24. 301 V1.0.0 and 3GPP (3rd generation partnership project) 3GPP TS 23. 401 V8.3.0.

In the case where the TAI list having a plurality of TAIs is used, the mobile terminal ceases to execute the location registration process at the time of moving within an area associated with the TAI contained in the TAI list. Therefore, the location registration process is executed less frequently, thereby making it possible to suppress the increased consumption of the wireless resources due to the location registration process. The information contained in the TAI list of the mobile terminal is updated at the time of the initial attachment (initial connection process) and at the time of executing the location registration process (TAU: tracking area update) started from the mobile terminal moving into an area of a TAI not contained in the TAI list. The base station periodically transmits, as the notification information, the TAI information associated with itself to the mobile terminal. The mobile terminal, by checking the TAI contained in the notification information transmitted from the base station, grasps which TA it is currently located in. In the case where the data terminates at the mobile terminal in standby mode with the TAI list of the mobile terminal managed by the call processing control unit, the call processing control unit judges that the mobile terminal in standby mode is located in an area corresponding to the TAI list, and requests the base stations in the area of the TAI list to notify the mobile terminal that the data has terminated at the mobile terminal. In the case where the location registration process is executed each time the mobile terminal moves between base stations, the call processing control unit can specify one base station as the location range of the mobile terminal in which the mobile terminal is controlled by the particular base station, and therefore, the amount of the wireless resources used for the call notification can be minimized. In the case where the location registration process is executed each time all the mobiles move between base stations, however, the location registration message is sent each time the mobile terminal moves between stations, and therefore, the location registration process is executed more frequently, thereby increasing both the consumption of the wireless resources and the power consumption of the mobile terminal. As a result, how the area (the area corresponding to the TAI list) for which the location registration process and the data termination process are executed is to be determined poses a problem to be solved for system optimization.

SUMMARY OF THE INVENTION

In the case where the TA management method according to the conventional technique in which a TA is divided into a plurality of areas each having a predetermined size is used for the call processing control unit, it is easily estimated that the same TAI list is allocated to a plurality of different mobile terminals moving in a bus or an electric tram. A multiplicity of mobile terminals holding the same TAI list, which cross the boundary line of the areas corresponding to the TAI list while moving in a bus or an electric tram, for example, start the location registration process at the same time with a base station located in the vicinity of the particular boundary line. The resulting concentration of the location registration process on the base station associated with the boundary line would locally impose a heavy burden on the wireless resources due to the location registration process. In order to suppress the consumption of local wireless resources due to the location registration process, a method is required to prevent the boundary line of the areas from being crossed at the same time by the simultaneous movement of a multiplicity of users. This problem is solved by allocating different TAI lists to different mobile terminals. Even in the method to reduce the local consumption of the wireless resources by allocating different TAI lists to different mobile terminals, however, the TAI list allocation which causes many cases of location registration in different areas cannot reduce the consumption of the wireless resources in the particular areas as a whole. A TAI list allocation method has to be conceived to reduce the local consumption of wireless resources by the location registration process while at the same time suppressing the number of times the location registration is made by the mobile terminals.

In the conventional system, the same TAI list is allocated to the mobile terminals associated with the same area. Once a multiplicity of mobile terminals holding the same TAI list cross a boundary line of an area at the same time, therefore, the location registration process is started at the same time by the mobile terminals (while moving in a bus or a tram, for example), and the problem is posed that a great amount of wireless resources are consumed by the location registration process.

JP-A-9-27985 discloses a technique in which in the case where a mobile terminal executes the location registration process, a location registration acceptance message containing the identifier of the wireless zone of the base station associated with the mobile terminal and the identifier of the neighboring wireless zones is sent to the mobile terminal for addition to the location registration area list originally existing in the location registration area table of the mobile terminal. The simple increase in the number of the location registration area lists, however, would excessively widen the location registration area, and make it difficult to grasp the accurate position of the mobile terminal, resulting in the inconvenience of the paging operation. Also, since the control operation is performed based on the wireless zone information generated for each base station, the problem is posed that the location registration process is required to be executed more frequently in an area where base stations are closely located than in the other areas.

JP-A-2008-193261, on the other hand, discloses a method in which the movement of a plurality of mobile terminals is monitored by a call processing control unit, and by resetting the TAI of the base station in accordance with the movement of the plurality of the mobile terminals, a location registration area is formed suitably for each area. This method of constructing a location registration area suitable for each area, however, fails to take into consideration the increase in the local consumption of the wireless resources due to the location registration process executed for a plurality of users simultaneously leaving the TAI list area. Thus, simple application of this technique to the wireless communication system provides no solution to the problem described above.

With regard to the paging area, JP-A-2006-211335 proposes a method using the GPS (Global Positioning System) information acquired by the GPS included in the mobile terminal as a means for efficiently specifying the paging area to be covered at the time of a call. In this case, the GPS position information acquired from the mobile terminal is managed by a central position information management unit. Further, by managing the history of the position information of the mobile terminal, the paging area is specified based on the latest position information thus managed. In addition to the location registration area information, therefore, the GPS position information can be easily used to specify the paging area for an improved paging process efficiency.

Further, the moving speed and acceleration of the mobile terminal are calculated as the travel condition thereof using the history of the position information of the mobile terminal, and by thus increasing or decreasing the paging area, the efficiency of the wireless resource consumption for paging is improved. In the method of determining the paging area by managing the history of the mobile terminal, however, the travel history is required to be managed for each mobile terminal, and therefore, the paging area cannot be easily managed by the call processing control unit. Also, the call processing control unit is required to prepare a history management data base for each mobile terminal, thereby posing the cost problem.

The wireless communication system according to this invention is configured of a wireless terminal (mobile terminal), a plurality of base stations communicating with the wireless terminal, and a call processing control unit for controlling the plurality of the base stations.

The wireless terminal, upon reception of the notification information from a base station, judges whether the area included in the notification information is included in the location registration area list stored in a storage unit, and in the case where the area is not so included, sends a location registration request to the call processing control unit. The call processing control unit, on the other hand, creates a new location registration area list from the area included in the notification information and the areas in the neighborhood of the area included in the notification information and sends it to the wireless terminal.

Also, according to this invention, there is provided a wireless communication system employing a location registration method, in which the paging area can be set using the technique for automatically setting the location registration area and the technique for automatically constructing a location registration area taking the travel pattern of the mobile terminal into consideration to set the location registration area.

The call processing control unit allocates the TAI list to the mobile terminal through the base station with the initial connection attempted by the mobile terminal or the transmission of the location registration message as a motive. According to this invention, the configuration of the TAI list is varied according to whether the travel pattern of the mobile terminal is recognized by the call processing control unit or not. The travel pattern is defined as the tendency of the mobile terminal to follow which route to reciprocate between two destinations.

[In the Case where the Call Processing Control Unit can Recognize the Mobile Terminal Travel Pattern]

The mobile terminal reciprocating between two destinations (the home and the working place, for example) tends to follow the same route. The route through which the mobile terminal has passed is held in the call processing control unit as a travel pattern and the TAI list corresponding to this route is allocated to the mobile terminal. Then, in the case where the mobile terminal follows the same route on the next occasion, the location registration process is not executed, and therefore, the consumption of the wireless resources which otherwise might be caused by the location registration process is reduced. According to the method of allocating the TAI list along the travel pattern of the mobile terminal, a limited location registration area is selected for each mobile terminal. Since the TAIs of the areas along the travel route are selected as the TAI list for each mobile terminal, the location registration area is configured to limit the location of the mobile terminal more easily at the time of starting the paging process to the mobile terminal. Also, in the case where the location registration area configuration is used for setting the paging area, the paging request can be issued to the base station in the travel pattern of the mobile terminal by using the TAI list allocated to the mobile terminal for setting the paging area. Therefore, the paging area can be effectively reduced.

[In the Case where the Call Processing Control Unit Cannot Recognize the Mobile Terminal Travel Pattern]

Before grasping the travel pattern of the mobile terminal, the call processing control unit cannot predict to which TA the mobile terminal moves from the TA corresponding to the currently associated base station, and therefore, the TAIs of the TA corresponding to the currently associated base station and the neighboring areas are allocated as a TAI list to the mobile terminal. Once the mobile terminal executes the location registration process, the TAIs corresponding to the TAs on the route passed are stored in the travel route data base by the call processing control unit. According to 3GPP (3rd generation partnership project) 3GPP TS 24. 301 V1.0.0, the mobile terminal can send to the call processing control unit, together with a location registration message requesting the call processing control unit to execute the location registration process, the TAI (last registered TAI) of the TA of the base station left by the mobile terminal. Also, the TAI of the base station (destination base station) used by the mobile terminal for the location registration process is set as the last known TAI by the call processing control unit. The TAIs of the intermediate TAI thus far passed through by the mobile terminal and held by the base stations, however, cannot be sent by the mobile terminal as the TAI list. According to this invention, the location registration area is divided as a grid and the TAIs of the TA corresponding to the base station currently associated with the mobile terminal and the TAs of the neighboring areas are allocated as a TAI list to the mobile terminal. Thus, it is possible to grasp the intermediate TAs passed by the mobile terminal to proceed from the staring TA (last registered TAI) to the destination (TA corresponding to the last known TAI). Assume that the mobile terminal holds, as supplied by the call processing control unit, the TAIs of the TA corresponding to the base station currently associated with the mobile terminal and the TAs of the neighboring areas as a TAI list. To move from the starting TA (last registered TAI) to the destination (last known TA) without execution of the location registration process, the mobile terminal passes through the boundary line between the areas corresponding to the TAI list currently held by the mobile terminal and the area corresponding to the last known TAI. The call processing control unit judges that the mobile terminal has passed through the area in the TAI list facing the area corresponding to the last known TAI on the other side of the boundary line, and sets the TAI corresponding to the particular area in the TAI list as an implicit known TAI. Each time the mobile terminal executes the location registration process, the call processing control unit stores the last visited registered TAI, the last known TAI and the implicit known TAI as a travel route of the mobile terminal, and recognizes the accumulated TAIs of the travel route as a travel pattern of the mobile terminal. The call processing control unit allocates the TAIs of the areas along the travel pattern of the mobile terminal to the mobile terminal as a TAI list. The mobile terminal that has received the TAI list is not required to execute the location registration process as long as it reciprocates through the areas along the travel pattern of the mobile terminal determined by the call processing control unit.

As described above, before grasping the travel pattern of the mobile terminal, the call processing control unit cannot predict to which TA the mobile terminal proceeds from the TA corresponding to the base station currently associated with the mobile terminal. Therefore, the TAIs of the TA corresponding to the currently associated base station and the TAs of the neighboring areas are allocated to the mobile terminal as a TAI list. In the case where the data terminates at the mobile terminal in standby mode without recognition of the travel pattern of the mobile terminal on the part of the call processing control unit, the call processing control unit judges that the mobile terminal in standby mode exists in an area corresponding to the TAI list, and requests the base stations associated with the areas of the TAI list to notify the mobile terminal of the data termination (paging request).

In the case where the travel pattern of the mobile terminal is successfully reflected in the TAI list by updating the TAI list using the last visited registered TAI, the last known TAI and the implicit known TAI as described above, on the other hand, the paging area can be determined based on the TAI list reflecting the travel pattern.

The call processing control unit recognizes the travel pattern of the mobile terminal, and the TAIs of the areas along the travel route are allocated to the mobile terminal as a TAI list as described above. The mobile terminal, as long as reciprocating in the areas along the travel pattern determined by the call processing control unit, is not required to execute the location registration process, and therefore, the consumption of the wireless resources which otherwise might be caused by the location registration process is suppressed.

Also, since the TAI list is allocated in accordance with the travel pattern of the mobile terminal, a different TAI list can be held for a different mobile terminal. With a different TAI list held for a different mobile terminal, a plurality of mobile terminals in tram or bus simultaneously cross the boundary line of the location registration area less frequently, and the load on the network is reduced. Further, the travel pattern of the mobile terminal is reflected in the TAI list by the location registration process described above, and therefore, by using it to set the paging area, the paging area can be determined effectively.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram showing the configuration of a mobile terminal.

FIG. 3 is a block diagram showing the configuration of a base station.

FIG. 7B is a sequence chart B showing the location registration process executed during the time when the mobile terminal moves from the starting area to the destination and returns to the starting area.

FIG. 7D is a sequence chart D showing the location registration process executed during the time when the mobile terminal moves from the starting area to the destination and returns to the starting area.

FIG. 7E is a sequence chart E showing the location registration process executed during the time when the mobile terminal moves from the starting area to the destination and returns to the starting area.

FIG. 7F is a sequence chart F showing the location registration process executed during the time when the mobile terminal moves from the starting area to the destination and returns to the starting area.

FIG. 12 is a schematic diagram showing the location registration process executed after the mobile terminal has moved through various areas.

DETAILED DESCRIPTION OF THE INVENTION

Embodiments of the invention are explained in detail below with reference to the accompanying drawings.

Figure 1:
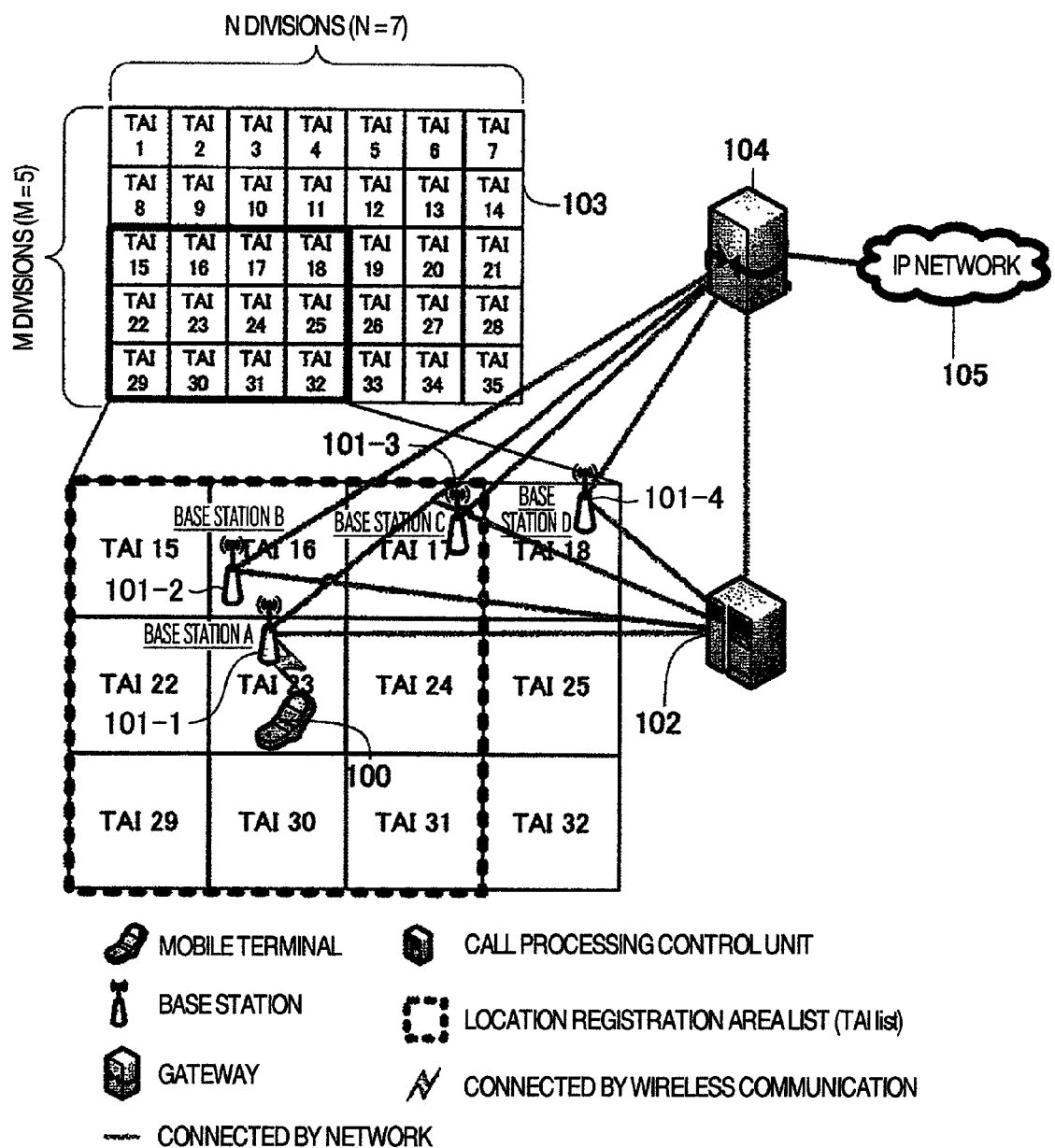
FIG. 1 is a diagram showing a configuration of the wireless communication system according to this invention.

FIG. 1 is a diagram showing the configuration of the wireless communication system according to this invention.

The wireless communication system includes a mobile 100 (also called a wireless terminal) 100, base stations 101 (four base stations, i.e. base stations A101-1, B101-2, C101-3 and D101-4 in the case under consideration), a call processing control unit 102 and a gateway 104. The mobile terminal 100 and the base stations 101 communicate with each other wirelessly. The base stations 101, the call processing control unit 102 and the gateway 104 are connected in wired mesh. The gateway 104 is connected to an IP network 105. The mobile terminal 100 transmits and receives data to and from a server located in the IP network 105 through the base stations 101 and the gateway 104. Each base station 101 is installed in a location registration area and holds the TAI corresponding to each TA. Each base station 101 transmits the TAI held therein to the mobile terminal 100 periodically as notification information. The mobile terminal 100 receives the TAI broadcast from the base stations 101 and judges in which TA the mobile terminal currently exists and whether the location registration process is to be executed or not.

The mobile terminal 100, upon judgment that the location registration process is to be executed, sends a location registration message to the base station A101-1. The base station A101-1 transfers the location registration message from the mobile terminal 100 to the call processing control unit 102. The call processing control unit 102, upon reception of the location registration message, recognizes that the mobile terminal 100 has moved under the control of the base station A101-1.

Next, a method of constructing the location registration area 103 is explained. In order to construct the location registration area taking the travel pattern of the mobile terminal into consideration, the call processing control unit 102 manages the location registration area divided in grids shown in FIG. 1 in advance. The location registration area is divided into M parts vertically, and N parts horizontally, and each grid area (TA) is allocated the TAI as serial numbers along the horizontal direction. Incidentally, according to this embodiment, M is set to 5 and N to 7 for a total of 35 grid areas allocated TAI1 to TA35. An explanation is given about a case in which one base station exists in the area of each TAI.

The base stations 101 periodically send the TAI held therein as notification information to the mobile terminal 100. The mobile terminal 1001, upon reception of the TAI broadcast from the base stations 101, judges in which TA it is currently located and whether the location registration process is to be executed or not.

In such a location registration area, the call processing control unit 102 monitors which TA the mobile terminal 100 has moved through, each time the location registration process is executed by the mobile terminal 100. Also, the call processing control unit 102 determines the travel route of the mobile terminal 100 based on the information of the location registration message sent from the mobile terminal 100.

FIG. 2 is a block diagram showing the configuration of the mobile terminal 100. The mobile terminal 100 includes a plurality of transmission/receiving antennas 20-1, 200-2, wireless analog units 201-1, 201-2 connected to the antennas 200, a digital signal processing unit 202 connected to the wireless analog units 201 and a call processing unit 203 connected to the digital signal processing unit 202.

The wireless analog units 201 convert the analog signal received from the base stations 101 through the antennas 200 into a digital signal and outputs it to the digital signal processing unit 202. Also, in each wireless analog unit 201, the digital signal received from the digital signal processing unit 202 is converted into an analog signal and transmitted to the base stations 101 through the antennas 200. The digital signal processing unit 202 demodulates the signal from the wireless analog units 201 and modulates the signal applied to the base stations 101. The call processing unit 203 includes a processor (controller) 210, a program memory 211 for registering the program executed by the processor 210, an area identifier broadcast from the base station 101 in which the mobile terminal has conducted the last location registration, and a location registration information data base 212 for registering the area identifier broadcast from the base stations for which the mobile terminal has executed the last location registration and the TAI list transmitted from the call processing control unit 102.

The mobile terminal 100 has the function of comparing TAI broadcast from the base stations 101 with the TAIs contained in TAI list registered in the location registration information data base 212, and the function of transmitting a location registration message containing the mobile terminal identifier to the base stations 101 based on the comparison result.

FIG. 3 is a block diagram showing the configuration of the base station 101. The base station 101 includes a plurality of transmission/receiving antennas 300-1, 300-2, wireless analog units 301-1, 301-2 connected to the antennas 300, a digital signal processing unit 302 connected to the wireless analog units 301, a call processor 304 connected to the digital signal processing unit 302 and a line interface unit 303 connected to the call processor 304. The line interface unit 303 is connected to the call processing control unit 102 and the gateway 104.

In the wireless analog units 301, the analog signal received from the mobile terminal 100 through the antennas 300 is converted into a digital signal and output to the digital signal processing unit 302. Also, in the wireless analog units 301, the digital signal received from the digital signal processing unit 302 is converted into an analog signal and transmitted to the mobile terminal 100 through the antennas 300. The digital signal processing unit 302 demodulates the signal from the wireless analog units 301 and modulates the signal to the mobile terminal 100. The call processor 304 includes a processor (controller) 310, a program memory 311 for registering the program executed by the processor 310, a base station identifier data base 312 for registering the base station identifiers and a location registration information data base 313 for registering the TAI broadcast to the mobile terminal 100.

The base stations 101 each have the function of transmitting the base station identifier thereof and the TAI to the call processing control unit 102, the function of adding the base station identifier and the TAI to the location registration message from the mobile terminal 100 and transmitting the resulting message to the call processing control unit 102, the function of sending a paging message to the mobile terminal 100 based on the paging request from the call processing control unit 102, and the function of transmitting the TAI as the notification information to the mobile terminal 100. The function of transmitting the notification information is called the notification information transmitter.

Figure 4:
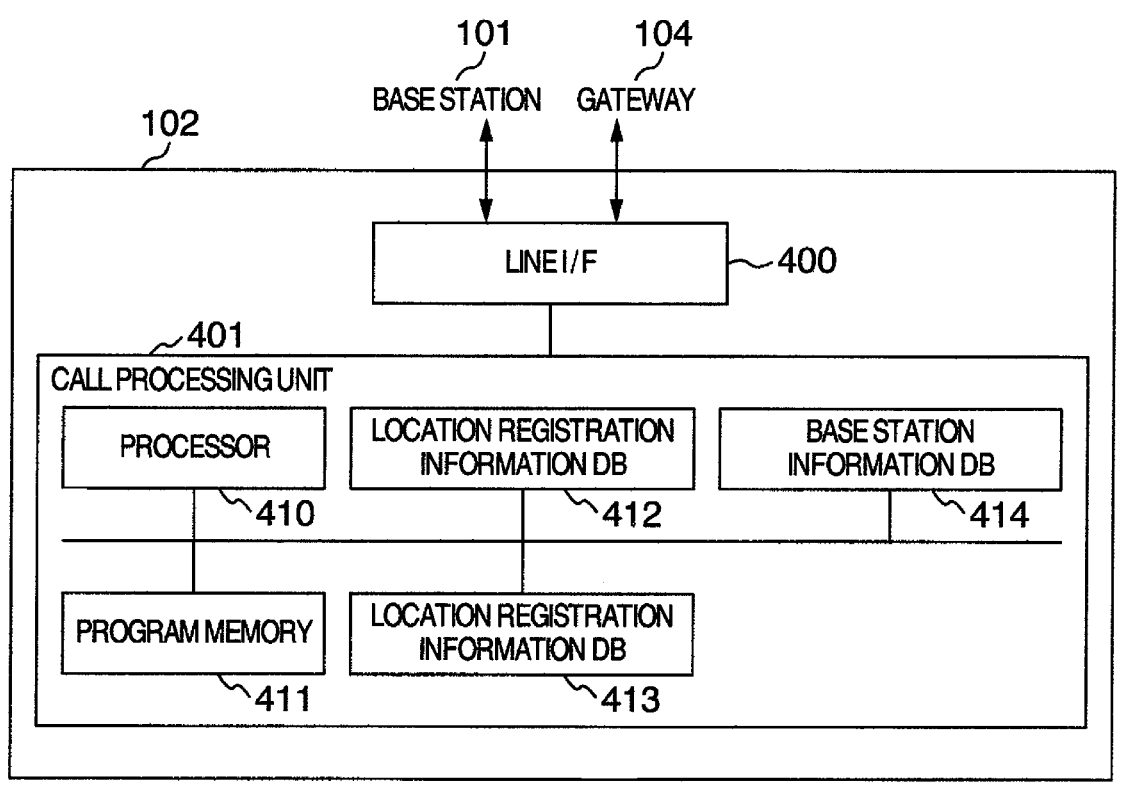
FIG. 4 is a block diagram showing the configuration of a call processing control unit.

FIG. 4 is a block diagram showing the configuration of the call processing control unit 102. The call processing control unit 102 includes a line interface unit 400 connected to the base stations 101 and the gateway 104, and a call processing unit 401 connected to the line interface unit 400.

The call processing unit 401 includes a processor (controller) 410, a program memory 411 for registering the program executed by the processor 410, a location registration information data base 412 for registering the TAIs of the areas on the route along which the mobile terminal 100 has moved, a location registration area information data base 413 for registering M as the number of vertical divisions and N as the number of horizontal divisions providing the information of the location registration area 103, and a base station information data base 414 for registering the area identifier and the base station identifier sent from each base station.

The call processing control unit 102 includes the function of registering the base station identifier and the TAI from the base stations 101 in the base station information data base 414, the function of registering, in the location registration information data base 412, the location registration message and the TAI from the mobile terminal 100 and the base station identifier of the base station 101 that has received the location registration message from the mobile terminal and the TAIs of the areas corresponding to the route along which the mobile terminal 100 has move, the function of determining the neighbor TAI of the TAI of the area currently associated with the base station covering the mobile terminal that has registered the location thereof, the function of determining an area identifier list allocated to the mobile terminal 100 from the TAI list of the areas corresponding to the travel route of the mobile terminal 100 registered in the location registration information data base 412, and the function of transmitting the TAI list to the mobile terminal 100 as a response message to the location registration message sent from the mobile terminal 100.

Also, the call processing control unit 102 has the function of storing the information of the location registration message from the base stations 101 in the location registration information data base for each mobile terminal 100, the function of determining a paging area based on the information stored in the location registration information data base, and the function of sending a message requesting the base station 101 in the determined paging area to send the paging message. The function to execute this paging is called the paging processor.

Figure 5:
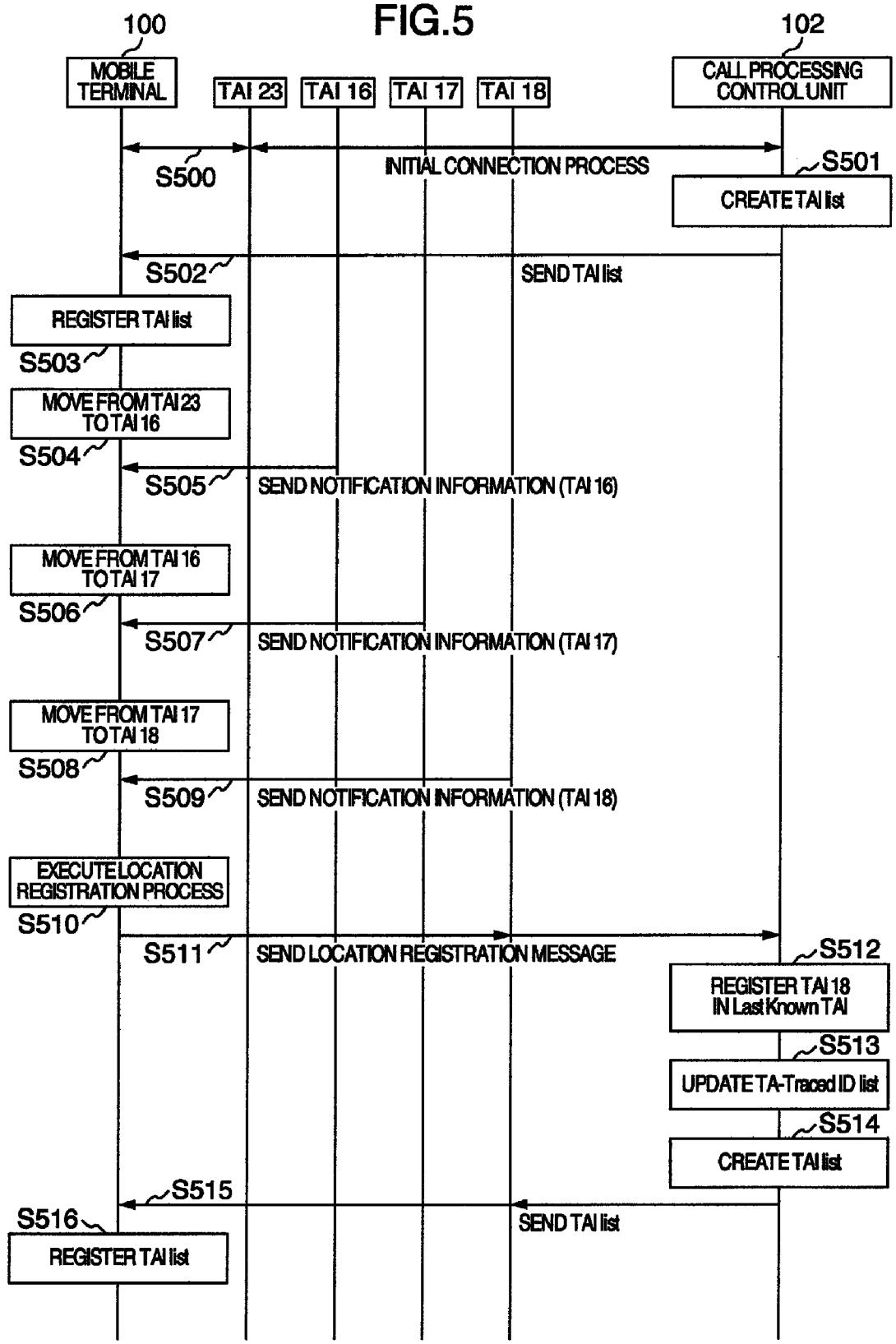
FIG. 5 is a sequence chart showing the location registration process with the mobile terminal moved.

FIG. 5 is a sequence chart for the location registration by the mobile terminal 100. This chart is explained together with the diagram showing the movement of the mobile terminal 100 shown in FIG. 6.

In FIG. 5, the mobile terminal 100 starts the initial connection process upon entrance into the area controlled by the base station A101-1 (TAI 23) (step 500).

The call processing control unit 102, during this initial connection process, transmits the TAI list to the mobile terminal 100. In the process, the call processing control unit 102 accesses the location registration information data base 412 and judges whether TAI 23 indicating the base station A101-1 is included in the TAI list or not, and in the case where it not so included, generates a TAI list allocated to the mobile terminal 100 and including the TA of the base station A101-1 and TAIs 15, 16, 17, 22, 23, 24, 29, 30, 31 of the neighboring TAs, which are sent to the mobile terminal 100 (steps 501, 502).

The mobile terminal 100, upon reception of the TAI list from the call processing control unit 102, stores the particular TAI list in the location registration information data base 212 (step 503).

After that, the mobile terminal 100, while staying in the area of TAI 23, receives the notification information (containing TAI 23) from the base station A101-1. In the process, the mobile station 100 judges whether TAI 23 is included in the TAI list stored in the location registration information data base 212. Since TAI 23 is so included, the location registration process is not executed.

The mobile terminal 100, once moved to the area of TAI 16 (step 504), receives the notification information (including TAI 16) from the base station B101-2 (step 505). In the process, the mobile terminal 100 judges whether TAI 16 is contained in the TAI list stored in the location registration information data base 212. Since TAI 16 is so contained, the location registration process is not executed.

Further, the mobile terminal 100, upon movement to the area of TAI 17 (step 506), receives the notification information (including TAI 17) from the base station C101-2 (step 507). In the process, the mobile terminal 100 judges whether TAI 17 is contained in the TAI list stored in the location registration information data base 212 or not. Since TAI is so contained, the location registration process is not executed.

Furthermore, the mobile terminal 100, upon movement to the area of TAI 18 (step 508), receives the notification information (including TAI 18) from the base station D101-4 (step 509). In the process, the mobile terminal 100 judges whether TAI 18 is contained in the TAI list stored in the location registration information data base 212. Since TAI 18 is not so contained, the location registration process is started for the bas station D101-4 (step 510).

To execute the location registration process, the mobile terminal 100 sends the location registration message to the call processing control unit 102 through the base station D101-4 (step 511). In the process, TAI 23 of the base station for which the preceding location registration process is executed is contained in the location registration message as a value of the last visited registered TAI.

Figure 6:
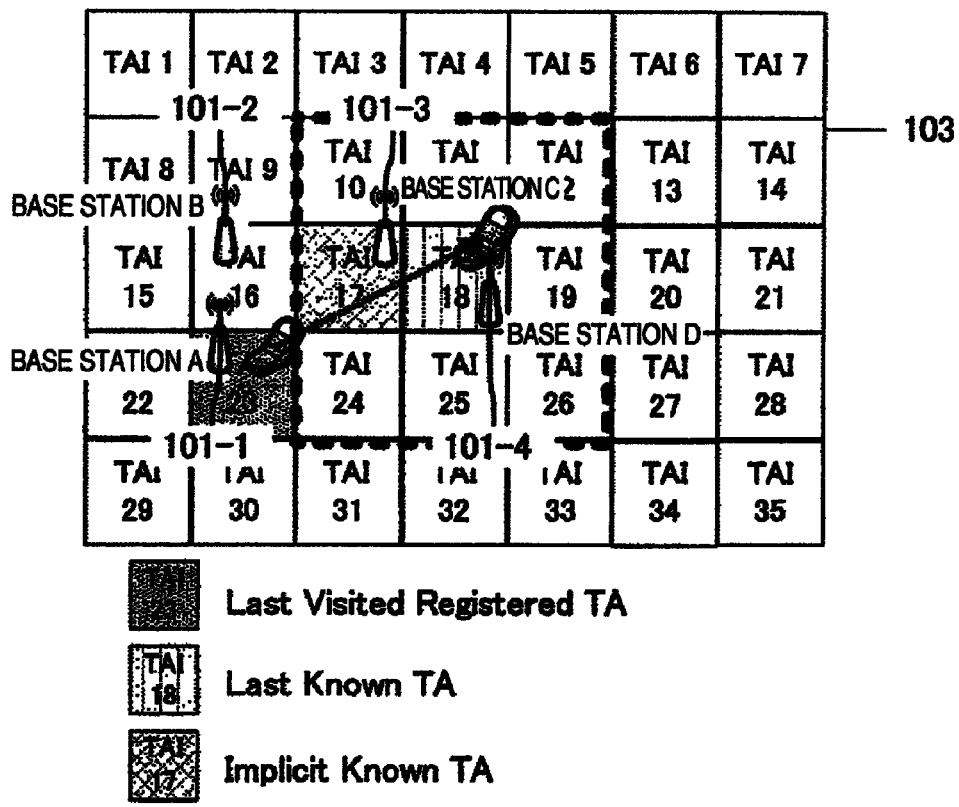
FIG. 6 is a schematic diagram showing the location registration process with the mobile terminal moved.

Also, the call processing control unit 102 sets the TAI of the base station D101-4 as the last known TAI. The last known TAI indicates the TAI of the base station 101 associated with the mobile terminal 100 that has executed the location registration process. In FIG. 6, the last known TAI is TAI 18.

The call processing control unit 102 determines the implicit known TAI based on the information of the last TAI list transmitted to the mobile terminal 100 and the last known TAI currently received from the mobile terminal 100. The implicit known TAI indicates the TAI allocated to the area through which the mobile terminal 100 has passed with a high probability when moving from the last visited registered TAI to the last known TAI.

Several choices are available for the mobile terminal 100 having thus far stayed in the area of TAI 23 to move to the area of TAI 18. They include a first choice in which the mobile terminal 100 proceeds through TAIs 23, 16, 17, 18 in that order, a second choice in which the mobile terminal 100 proceeds through TAIs 23, 24, 17, 18 in that order, a third choice in which the mobile terminal 100 proceeds through TAIs 23, 24, 25, 18 in that order, etc. In the case where the route of the choice (3) is followed, the area of TAI 25 is entered before the area of TAI 18, and therefore, the location registration process should be executed at the particular time point. If the location registration process is not executed at that time point, it indicates that the route of the choice (3) is not followed. Thus, the mobile terminal 100 has followed the route of choice (1) or (2), and in any way, passes through the area of TAI 17. TAI 17 calculated in this way is set as the implicit known TA.

According to this embodiment, there is proposed a method of automatically generating an efficient area identifier list using the information elements of the implicit known TAI anew in addition to the information of the last visited registered TAI and the last known TAI used in the prior art.

Specifically, assume that the mobile terminal 100 holds, as a TAI list as received from the call processing control unit 102, the TAIs of the TA corresponding to the base station currently associated with the mobile terminal 100 and the TAIs of the neighboring TAs. To move from the starting area (TA corresponding to the last visited registered TAI) to the destination (TA corresponding to the last known TAI) without the location registration process, the mobile terminal 100 is expected to pass through the boundary line adjoining the area corresponding to the TAI list currently held by the mobile terminal 100 and the area corresponding to the last known TAI. The call processing control unit 102 thus judges that the mobile terminal 100 has moved through the area facing the area of the last known TAI beyond the particular boundary line, and sets the TAI corresponding to the particular area as the implicit known TAI.

Following step 511, the call processing control unit 102 that has received the location registration message from the base station D101-4 registers TAI 18 of the base station D101-4 as the last known TAI (step 512).

The call processing control unit 102 registers the three information including the last visited registered TAI, the last known TAI and the implicit known TAI in the TA-traced ID list of the location registration information data base 412 as the travel route of the mobile terminal 100 (step 513). The TA-traced ID list is a TAI list indicating the travel route of the mobile terminal 100. This list is also called the travel area list. According to this embodiment, the call processing control unit 102 accumulates the TAI providing the travel route of the mobile terminal 100 in the TA-traced ID list each time the mobile terminal 100 executes the location registration process. Once a sufficient number of TAIs are accumulated in the TA-traced ID list, the travel pattern of each mobile terminal 100 can be determined.

The call processing control unit 102 determines the TAI list required to be allocated to the mobile terminal 100 from the TA-traced ID list of the location registration information data base 412 (step 514). The call processing control unit 102, by accessing the location registration information data base 412, recognizes that TAI 18 indicating the base station D101-4 received from the mobile terminal 100 in step 511 is not contained in the TA-traced ID list, and constructs, as a TAI list allocated to the mobile terminal 100, a list containing the TAIs 10, 11, 12, 17, 18, 19, 24, 25 including the TAI of the base station D101-4 and the neighboring TAs, which list is sent to the mobile terminal 100 (step 515).

The mobile terminal 100, upon reception of the TAI list from the call processing control unit 102 in step 515, registers the contents of the received TAI list in the location registration information data base 212 in the mobile terminal 100 (step 516).

According to the specification of 3GPP (3rd generation partnership project) 3GPP TS 24.301 V1.0.0, a maximum of 16 TAIs can be registered in the TAI list. The TA-traced ID list is an area identifier list not described in 3GPP (3rd generation partnership project) 3GPP TS 24.301 V1.0.0 and 3GPP (3rd generation partnership project) 3GPP TS 23.401 V8.3.0, and a TAI list created to indicate the travel route of the mobile terminal 100.

With reference to the sequence charts of FIGS. 7A to 7G and the corresponding travel charts of FIGS. 8A to 8G for the mobile terminal 100, an explanation is made about the process of updating the location registration information data base of the call processing control unit 102 and the mobile terminal 100 held by the user during the period when the user moves from the starting area (TAI 23) such as his/her home to the destination 801 (TAI 13) such as his/her working place and returns again to the starting area (TAI 23).

Figure 7A:
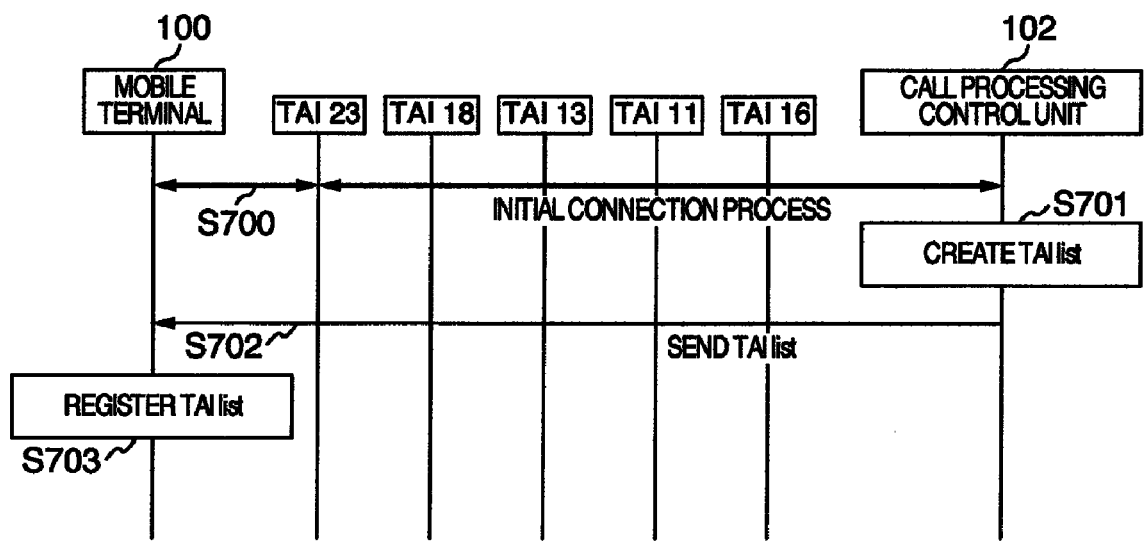
FIG. 7A is a sequence chart A showing the location registration process executed during the time when the mobile terminal moves from the starting area to the destination and returns to the starting area.
Figure 8A:
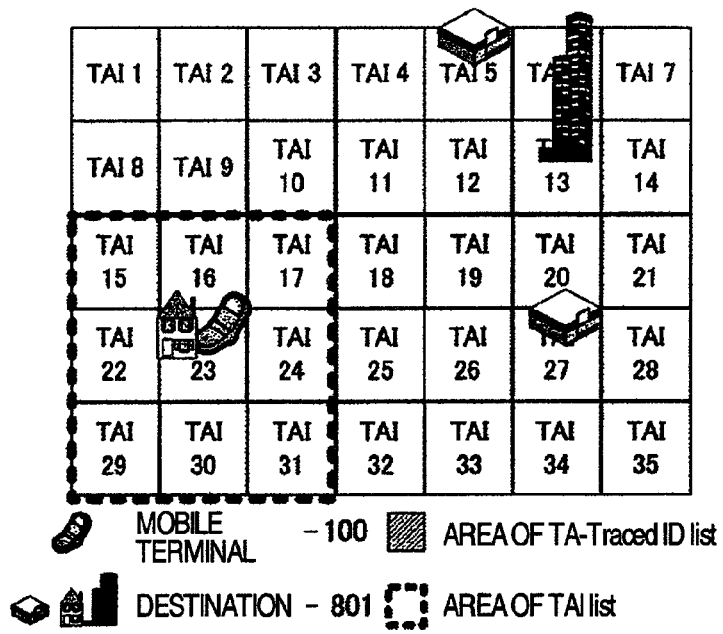
FIG. 8A is a schematic diagram A showing the location registration process executed during the time when the mobile terminal moves from the starting area to the destination and returns to the starting area.

As shown in FIGS. 7A and 8A, the mobile terminal 100 starts the initial connection process to conduct wireless communication in the area controlled by the base station A101-1 (TAI 23) (step 700).

The call processing control unit 102 sends the TAI list to the mobile terminal 100 during the initial connection process.

In the process, the call processing control unit 102 accesses the location registration information data base 412 and judges whether TAI 23 indicating the base station A101-1 is contained in the TAI list or not. In the case where TAI 23 is no so contained, a TAI list allocated to the mobile terminal 100 and containing the TA covering the base station A101-1 and the neighboring TAIs 15, 16, 17, 22, 23, 24, 29, 30, 31 is created (step 701) and sent to the mobile terminal 100 (step 702).

Incidentally, in the location registration information data base 412 of the call processing control unit 102, TAI 23 is registered as the last known TAI, but for lack of the object of registration, "null" is registered in the last visited registered TAI, the implicit known TAI and the TA-traced ID list.

The mobile terminal 100, upon reception of the TAI list from the call processing control unit 102, stores the particular TAI list in the location registration information data base 212 (step 703).

Incidentally, TAI 23 for which the location registration process is currently executed is registered as the last visited registered TAI of the location registration information data base 212 of the mobile terminal 100.

Figure 8B:
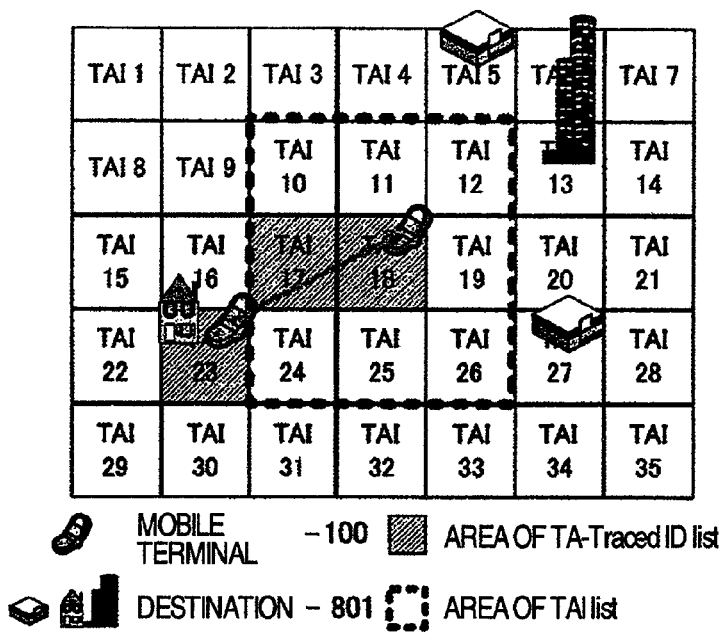
FIG. 8B is a schematic diagram B showing the location registration process executed during the time when the mobile terminal moves from the starting area to the destination and returns to the starting area.

Next, as shown in FIGS. 7B and 8B, the mobile terminal 100, upon movement into the area of TAI 18 (step 704), receives the notification information (including TAI 18) from the base station existing in the area of TAI 18 (step 705). In the process, the mobile terminal 100 judges whether TAI 18 is contained in the TAI list stored in the location registration information data base 212. Since TAI 18 is not so contained, the location registration process is started for the base station existing in the area of TAI 18 (step 706).

The mobile terminal 100, at the time of execution of the location registration process, sends the location registration message showing that the last visited registered TAI indicating the area for which the preceding location registration is executed is TAI 23 (step 707). The base stations 101 that has received the location registration message from the mobile terminal 100, adds the base station identifier and the TAI to the location registration message, and sends it to the call processing control unit 102. The call processing control unit 102, by checking the base station identifier and the TAI attached to the location registration message, recognizes that the base station currently associated with by the mobile terminal 100 having executed the location registration process is TAI 18. The call processing control unit 102 sets TAI 18 of the base station currently associated with the mobile terminal 100 as the last known TAI (step 708), and judges whether the last known TAI (TAI 18) is included in the TA-traced ID list. Since "null" is registered in the TA-traced ID list, the last known TAI (TAI 18) set is not included in the TA-traced ID list (step 709). Thus, the call processing control unit 102 proceeds to the "TAI allocation process by neighbors" (step 710).

In the "TAI allocation process by neighbors", the call processing control unit 102 registers, in the location registration information data base 412, TAI 23 as the value of the last visited registered TAI sent from the mobile terminal 100. Also, the call processing control unit 102 determines TAI 17 as the implicit known TAI based on the last TAI list and the last known TAI information allocated to the mobile terminal 100, and registers it in the location registration information data base 412 (step 711). The call processing control unit 102 registers the last visited registered TAI (TAI 23), the last known TAI (TAI 18) and the implicit known TAI (TAI 17) in TA-traced ID list of the location registration information data base 412 (step 712).

Next, the call processing control unit 102 determines TAIs 10, 11, 12, 7, 19, 24, 25, 26 in the neighborhood of TAI 18 as the neighbor TAIs of the last known TAI (TAI 18). The call processing control unit 102 sets the last known TAI (TAI 18) and the neighbor TAIs (TAIs 10, 11, 12, 17, 19, 24, 25, 26) allocated to the mobile terminal 100 (step 713), and by registering them in the location registration information data base 412, sends the TAI list to the mobile terminal (step 714).

The mobile terminal 100 receives the TAI list from the call processing control unit 102 through the base stations 101. The TAI list has set therein TAIs 10, 11, 12, 17, 18, 19, 24, 25, 26, which are registered by the mobile terminal 100 in the location registration information data base 212 (step 715). Incidentally, TAI 18 for which the location registration process is currently executed is registered as the last visited registered TAI of the location registration information data base 212.

Figure 7C:
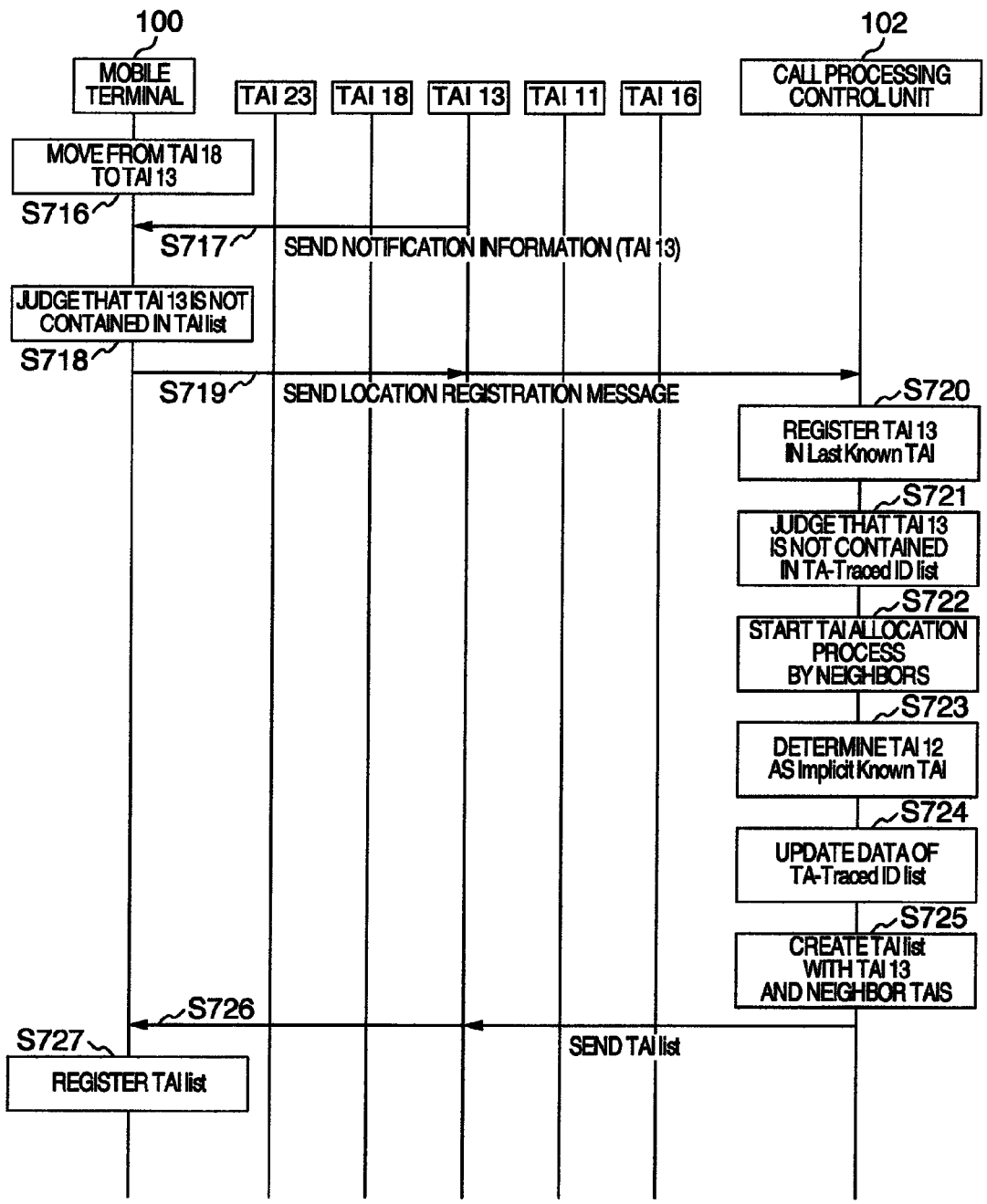
FIG. 7C is a sequence chart C showing the location registration process executed during the time when the mobile terminal moves from the starting area to the destination and returns to the starting area.
Figure 8C:
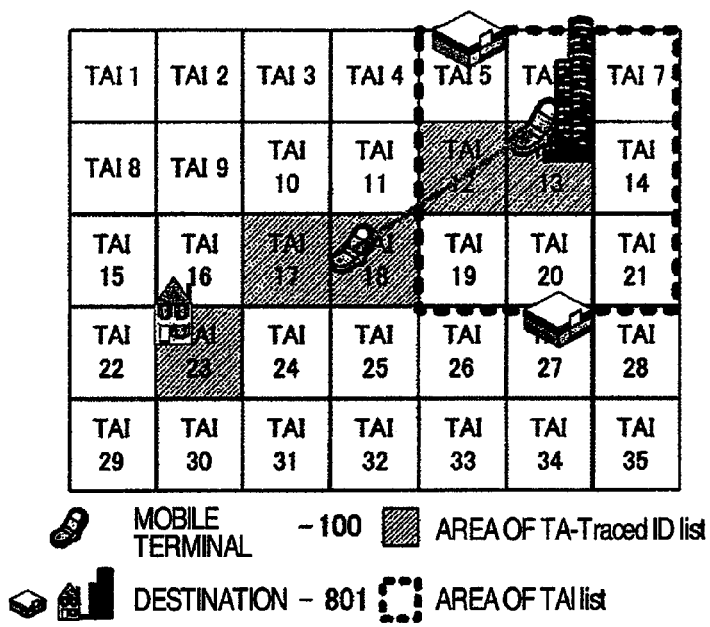
FIG. 8C is a schematic diagram C showing the location registration process executed during the time when the mobile terminal moves from the starting area to the destination and returns to the starting area.

Next, as shown in FIGS. 7C and 8C, the mobile terminal 100, as it moves to the area of TAI 13 (step 716), receives the notification information (including TAI 13) from the base station existing in the area of TAI 13 (step 717). In the process, the mobile terminal 100 judges whether TAI 13 is contained in the TAI list stored in the location registration information data base 212. Since TAI 13 is not so contained, the location registration process is started for the base station existing in the area of TAI 13 (step 718).

At the time of executing the location registration process, the mobile terminal 100 sends a location registration message notifying that the last visited registered TAI indicating the area of the preceding location registration is TAI 18 (step 719). The base station 101, upon reception of the location registration message from the mobile terminal 100, sends the location registration message with the base station identifier and TAI attached thereto to the call processing control unit 102. The call processing control unit 102, by checking the base station identifier and TAI attached to the location registration message, recognizes that the base station currently associated with the mobile terminal 100 having executed the location registration process is TAI 13. The call processing control unit 102 sets TAI 13 of the base station currently associated with the mobile terminal 100 as the last known TAI (step 720), and judges whether the last known TAI (TAI 13) is contained in the TA-traced ID list or not. Since TAIs 17, 18, 23 are registered in the TA-traced ID list, the last known TAI (TAI 18) that has been set is not contained in the TA-traced ID list (step 721), and therefore, the call processing control unit 102 proceeds to the "TAI allocation process by neighbors" (step 722).

In the "TAI allocation process by neighbors", the call processing control unit 102 registers, in the location registration information data base 412, TA 18 as the value of the last visited registered TAI sent from the mobile terminal 100. Also, the call processing control unit 102 determines TAI 12 as the implicit known TAI based on the information of the last known TAI and the last TAI list allocated to the mobile terminal 100 and registers it in the location registration information data base 412 (step 723). The call processing control unit 102 additionally registers the last visited registered TAI (TAI 18), the last known TAI (TAI 13) and the implicit known TAI (TAI 12) in the TA-traced ID list of the location registration information data base 412 (step 724)

Next, the call processing control unit 102 determines TAIs 5, 6, 7, 12, 14, 19, 20, 21 existing in the neighborhood of TAI 13 as the neighbor TAIs of the last known TAI (TAI 13). The call processing control unit 102 sets the last known TAI (TAI 13) and the neighbor TAIs (TAIs 5, 6, 7, 12, 14, 19, 20, 21) allocated to the mobile terminal 100 (step 725), and by registering them in the location registration information data base 412, sends the TAI list to the mobile terminal 100 (step 726).

The mobile terminal 100 receives the TAI list from the call processing control unit 102 through the base stations 101. The TAIs 5, 6, 7, 12, 13, 14, 19, 20, 21 are set in the TAI list, and registered in the location registration information data base 212 by the mobile terminal 100 (step 727). Incidentally, TAI 13 for which the location registration process is currently executed is registered as the last visited registered TAI of the location registration information data base 212 of the mobile terminal 100.

Figure 8D:
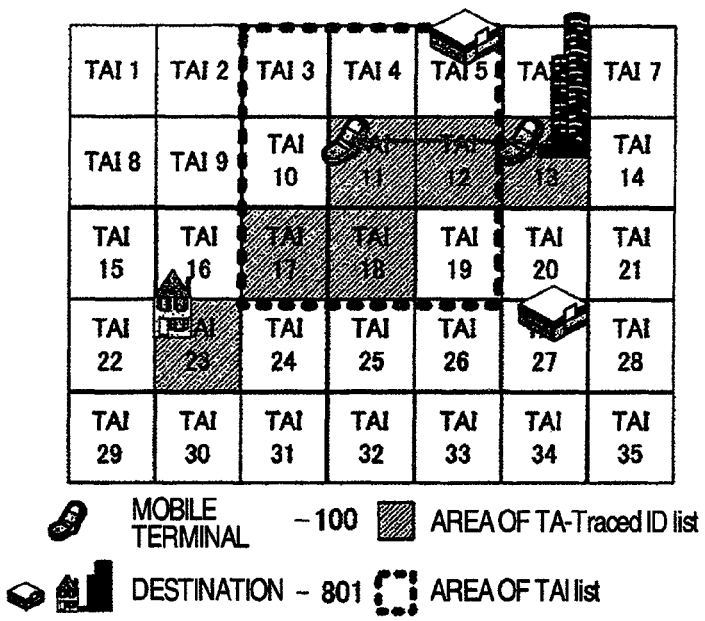
FIG. 8D is a schematic diagram D showing the location registration process executed during the time when the mobile terminal moves from the starting area to the destination and returns to the starting area.

Next, as shown in FIGS. 7D and 8D, the mobile terminal 100 moving into the area of TAI 11 (step 728) receives the notification information (including TAI 11) from the base station existing in the area of TAI 11 (step 729). In the process, the mobile terminal 100 judges whether TAI 11 is contained or not in the TAI list stored in the location registration information data base 212. Since TAI 11 is not so contained, the location registration process is started for the base station existing in the area of TAI 11 (step 730).

The mobile terminal 100, in executing the location registration process, sends a location registration message notifying that the last visited registered TAI indicating the area of the preceding location registration is TAI 13 (step 731). The base station 101 that has received the location registration message from the mobile terminal 100 sends the location registration message, together with the base station identifier and TAI, to the call processing control unit 102. The call processing control unit 102, by checking the base station identifier and TAI added to the location registration message, recognizes that the base station currently associated with the location registration process executed by the mobile terminal 100 is TAI 11. The call processing control unit 102 sets TAI 11 of the base station currently associated with the mobile terminal 100 as the last known TAI (step 732), and judges whether the last known TAI (TAI 11) is contained in the TA-traced ID list or not. In the process, TAIs 12, 13, 17, 18, 23 are registered in the TA-traced ID list. Since the last known TAI (TAI 11) that has been set is not contained in the TA-traced ID list (step 733), the call processing control unit 102 proceeds to the "TAI allocation process by neighbors" (step 734).

In the "TAI allocation process by neighbors", the call processing control unit 102 registers, in the location registration information data base 412, TAI 13 as the value of the last visited registered TAI sent from the mobile terminal 100. Also, the call processing control unit 102 determines TAI 12 as the implicit known TAI based on the information of the last known TAI and the last TAI list allocated to the mobile terminal 100, and registers them in the location registration information data base 412 (step 735). The call processing control unit 102 additionally registers the last visited registered TAI (TAI 13), the last known TAI (TAI 11) and the implicit known TAI (TAI 12) in the TA-traced ID list of the location registration information data base 412 (step 736). Incidentally, in the stage illustrated in FIGS. 7D and 8D, the TAIs 12, 13 are already registered in the TA-traced ID list of the location registration information data base 412, and therefore, no additional registration is required.

Next, the call processing control unit 102 determines TAIs 3, 4, 5, 10, 12, 17, 18, 19 existing in the neighborhood of TAI 11 as the neighbor TAIs of the last known TAI (TAI 11). The call processing control unit 102 sets the last known TAI (TAI 11) and the neighbor TAIs (TAIs 3, 4, 5, 10, 12, 17, 18, 19) allocated to the mobile terminal 100 (step 737), and by registering them in the location registration information data base 412, sends the TAI list to the mobile terminal 100 (step 738).

The mobile terminal 100 receives the TAI list from the call processing control unit 102 through the base stations 101. The TAIs 3, 4, 5, 10, 11, 12, 17, 18, 19 are set in the TAI list and registered by the mobile terminal 100 in the location registration information data base 212 (step 739). Incidentally, TAI 11 subjected to the current location registration process is registered as the last visited registered TAI in the location registration information data base 212.

Figure 8E:
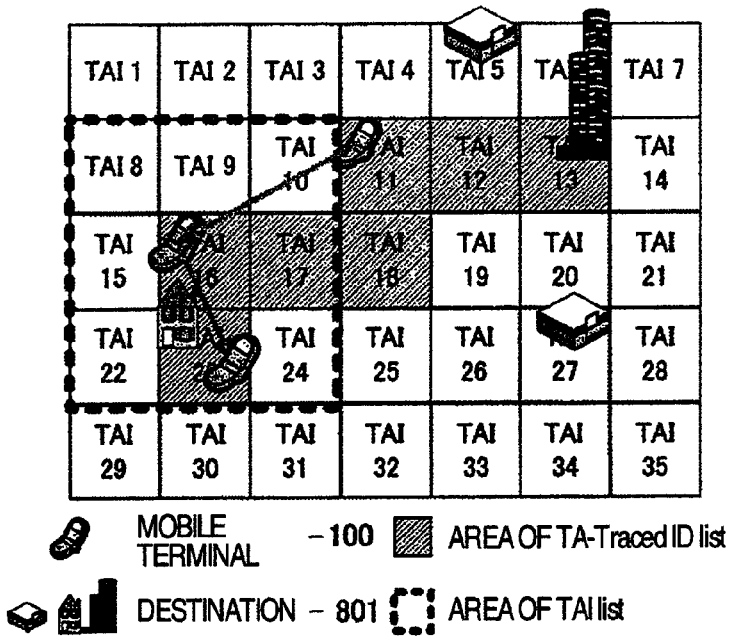
FIG. 8E is a schematic diagram E showing the location registration process executed during the time when the mobile terminal moves from the starting area to the destination and returns to the starting area.

Next, as shown in FIGS. 7E and 8E, the mobile terminal 100 that has moved to the area of TAI 16 (step 740) receives the notification information (containing TAI 16) from the base station existing in the area of TAI 16 (step 741). In the process, the mobile terminal 100 judges whether TAI 16 is contained in the TAI list stored in the location registration information data base 212. Since TAI 16 is not so contained, the location registration process is started for the base station existing in the area of TAI 16 (step 742).

The mobile terminal 100, in executing the location registration process, sends the location registration message notifying that the last visited registered TAI indicating the area of the preceding location registration is TAI 11 (step 743). The base stations 101 that has received the location registration message from the mobile terminal 100 adds the base station identifier and TAI to the location registration message and sends them to the call processing control unit 102. The call processing control unit 102, by checking the base station identifier and TAI attached to the location registration message, recognizes that the base station currently associated with the location registration process executed by the mobile terminal 100 is TAI 16. The call processing control unit 102 sets TAI 16 of the base station currently associated with the mobile 10 as the last known TAI (step 744), and judges whether the last known TAI (TAI 16) is contained in the TA-traced ID list or not. Since TAIs 11, 12, 13, 17, 18, 23 are registered in the TA-traced ID list, the last known TAI (TAI 16) that has been set is not contained in the TA-traced ID list (step 745), and therefore, the call processing control unit 102 proceeds to the "TAI allocation process by neighbors" (step 746).

In the "TAI allocation process by neighbors", the call processing control unit 102 registers, in the location registration information data base 412, TAI 11 as the value of the last visited registered TAI sent from the mobile terminal 100. Also, the call processing control unit 102 determines TI 17 as the implicit known TAI based on the last TAI list allocated to the mobile terminal 100 and the information of the last known TAI, and registers it in the location registration information data base 412 (step 747). The call processing control unit 102 additionally registers the last visited registered TAI (TAI 11), the last known TAI (TAI 16) and the implicit known TAI (TAI 17) in the TA-traced ID list of the location registration information data base 412 (step 748). Incidentally, in the stage illustrated in FIGS. 7E and 8E, TAIs 11, 17 are already registered in the TA-traced ID list of the location registration information data base 412, and therefore, no additional registration is required.

Next, the call processing control unit 102 determines TAIs 8, 9, 10, 15, 17, 22, 23, 24 existing in the neighborhood of TAI 16 as the neighbor TAIs of the last known TAI (TAI 16). The call processing control unit 102 sets the last known TAI (TAI 16) and the neighbor TAIs (TAIs 8, 9, 10, 15, 17, 22, 23, 24) in the TAI list assigned to the mobile terminal 100 (step 749), and by registering them in the location registration information data base 412, sends the TAI list to the mobile terminal 100 (step 750).

The mobile terminal 100 receives the TAI list from the call processing control unit 102 through the base station 101. TAIs 8, 9, 10, 15, 16, 17, 22, 23, 24 are set in the TAI list, and the mobile terminal 100 registers them in the location registration information data base 212 (step 751). Incidentally, TAI 16 subjected to the current location registration process is registered as the last visited registered TAI in the location registration information data base 212 of the mobile terminal 100.

After that, the mobile terminal 100, as it moves to the area of TAI 23 (step 752), receives the notification information (information containing TAI 23) from the base station existing in the area of TAI 23 (step 753). In the process, the mobile terminal 100 judges whether TAI 23 is contained in the TAI list stored in the location registration information data base 212 or not. Since TAI 23 is so contained (step 754), the location registration process is not required (step 755).

Figure 8F:
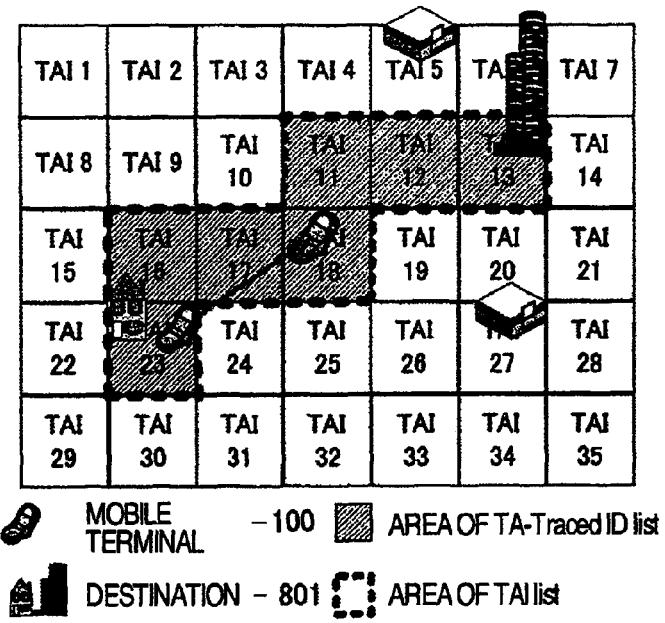
FIG. 8F is a schematic diagram F showing the location registration process executed during the time when the mobile terminal moves from the starting area to the destination and returns to the starting area.

Next, as shown in FIGS. 7F and 8F, the mobile terminal 100, as it moves to the area of TAI 18 from the area of TAI 23 (step 756), receives the notification information (information containing TAI 18) from the base station existing in the area of TAI 18 (step 757). Since TAI 18 is not contained in the TAI list stored in the location registration information data base 212, the mobile 100 starts the location registration process for the base station existing in the area of TAI 18 (step 758).

The mobile terminal 100, in executing the location registration process, sends a location registration message indicating that the last visited registered TAI designating the area of the preceding location registration is TAI 18 (step 759). The base station 101 that has received the location registration message from the mobile terminal 100 adds the base station identifier and TAI to the location registration message and sends it to the call processing control unit 102. The call processing control unit 102, by checking the base station identifier and TAI attached to the location registration message, recognizes that the base station currently associated with the mobile terminal 100 to execute the location registration process is TAI 18. The call processing control unit 102 sets TAI 18 of the base station currently associated with the mobile 100 as the last known TAI (step 760), and judges whether the last known TAI (TAI 18) is contained in the TA-traced ID list or not. Since TAIs 11, 12, 13, 16, 17, 18, 23 are registered in the TA-traced ID list, the last known TAI (TAI 18) that has been set is contained in the TA-traced ID list (step 761), and therefore, the call processing control unit 102 proceeds to the "TAI allocation process by TA-traced ID list" (step 762).

In the "TAI allocation process by the TA-traced ID list", the call processing control unit 102 judges that the mobile terminal 100 moves along the routine travel route, and directly employs, as the TAI list, TAIs 11, 12, 13, 16, 17, 18, 23 contained in the TA-traced ID list (step 763). As a result, TAIs 11, 12, 13, 16, 17, 18, 23 are set in the TAI list and registered in the location registration information data base 412. Then, the TAI list is sent to the mobile terminal 100 (step 764). Incidentally, the acquisition of the implicit known TAI is not required in this case.

The mobile terminal 100 receives the TAI list from the call processing control unit 102 through the base station 101. TAIs 11, 12, 13, 16, 17, 18, 23 are set in the TAI list, and the mobile terminal 100 registers them in the location registration information data base 212 (step 765). Incidentally, TAI 18 subjected to the current location registration process is registered as the last visited registered TAI of the location registration information data base 212 of the mobile terminal 100.

The process shown in FIGS. 7A to 7F and 8A to 8F described above completes a continuous travel route (TAIs 23, 16, 17, 18, 11, 12, 13) including adjacent TAI between the starting place (TAI 23) to the destination 801 (TAI 13). In the next session of the location registration process executed by the mobile terminal 100 on this travel route, the call processing control unit 102 judges that the mobile terminal 100 moves along the routine travel route, and registers TAIs 23, 16, 17, 18, 11, 12, 13 in the TAI list, which list is supplied to the mobile terminal 100. The mobile terminal 100, as long as it moves in accordance with the travel pattern between the two destinations in TAI23 and TAI13, executes no location registration process, and therefore, the wireless resources which otherwise might be consumed by the location registration process can be reduced.

The mobile terminal 100, if moved from TAI 18 to TAI 19 following step 765 shown in FIG. 7F, proceeds to the "TAI allocation process by neighbors" again.

Figure 7G:
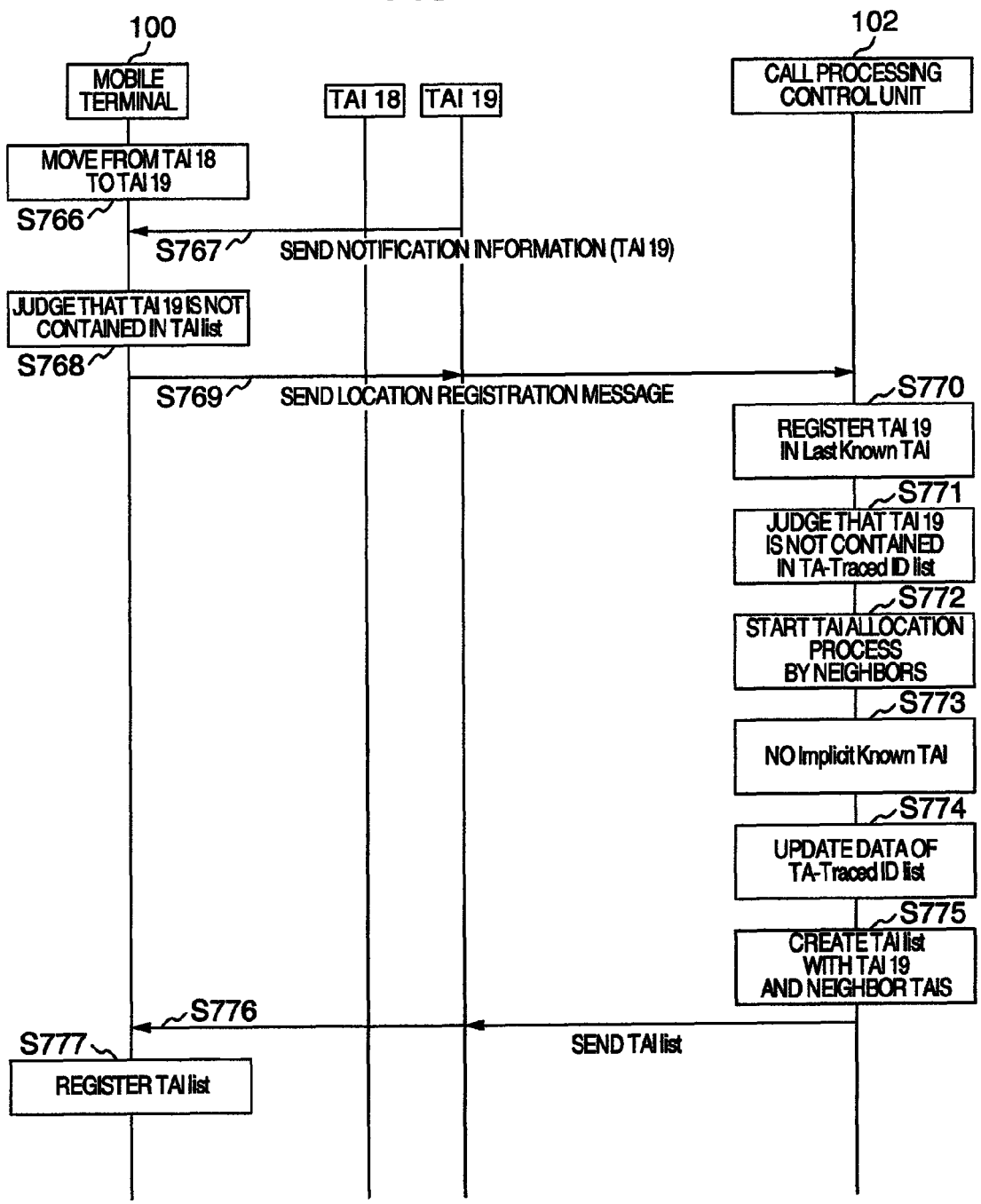
FIG. 7G is a sequence chart G showing the location registration process executed during the time when the mobile terminal moves from the starting area to the destination and returns to the starting area.
Figure 8G:
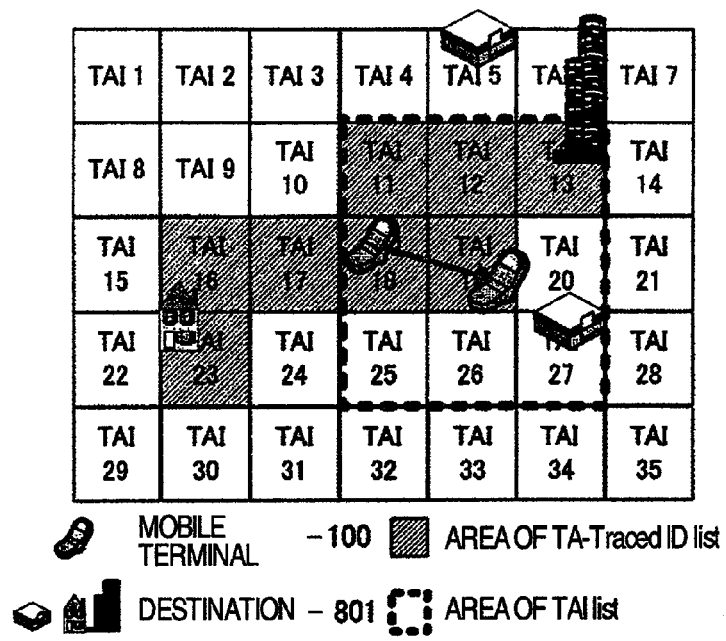
FIG. 8G is a schematic diagram G showing the location registration process executed during the time when the mobile terminal moves from the starting area to the destination and returns to the starting area.

As shown in FIGS. 7G and 8G, the mobile terminal 100, once moved to the area of TAI 19 (step 766), receives the notification information (containing TAI 19) from the base station 101 existing in the TAI 19 area (step 767). In the process, the mobile terminal 100 judges whether TAI 19 is contained in the TAI list stored in the location registration information data base 212. Since TAI 19 is not so contained, the location registration process is started for the base station existing in the TAI 19 area (step 768).

The mobile terminal 100, in executing the location registration process, sends a location registration message notifying that the last visited registered TAI indicating the area of the preceding location registration is TAI 18 (step 769). The base station 101 that has received the location registration message from the mobile terminal 100 adds the base station identifier and TAI to the location registration message and sends it to the call processing control unit 102. The call processing control unit 102, by checking the base station identifier and TAI attached to the location registration message, recognizes that the base station currently associated with the mobile terminal 100 in the location registration process is TAI 19. The call processing control unit 102 sets TAI 19 of the base station currently associated with the mobile 10 as the last known TAI (step 770), and judges whether the last known TAI (TAI 19) is contained in the TA-traced ID list or not. Since TAIs 11, 12, 13, 16, 17, 18, 23 are registered in the TA-traced ID list, the last known TAI (TAI 19) set is not contained in the TA-traced ID list (step 771), and therefore, the call processing control unit 102 proceeds to the "TAI allocation process by neighbors" (step 772).

In the "TAI allocation process by neighbors", the call processing control unit 102 registers, in the location registration information data base 412, TAI 18 as the value of the last visited registered TAI sent from the mobile terminal 100. In this case, the call processing control unit 102 is not required to determine the implicit known TAI (step 773). The call processing control unit 102 additionally registers the last visited registered TAI (TAI 18) and the last known TAI (TAI 19) in the TA-traced ID list of the location registration information data base 412 (step 774). Incidentally, in the stage of FIGS. 7F and 8F, TAI 18 is already registered in the TA-traced ID list of the location registration information data base 412, and therefore, not required to be additionally registered.

Next, the call processing control unit 102 determines TAIs 11, 12, 13, 18, 20, 25, 26, 27 existing in the neighborhood of TAI 19 as the neighbor TAIs of the last known TAI (TAI 19). The call processing control unit 102 sets the last known TAI (TAI 19) and the neighbor TAIs (TAIs 11, 12, 13, 18, 20, 25, 26, 27) assigned to the mobile terminal 100 (step 775), and by registering them in the location registration information data base 412, sends the TAI list to the mobile terminal 100 (step 776).

The mobile terminal 100 receives the TAI list from the call processing control unit 102 through the base station 101. TAIs 11, 12, 13, 18, 19, 20, 25, 26, 27 are set in the TAI list, and the mobile terminal 100 registers them in the location registration information data base 212 (step 777). Incidentally, TAI 19 subjected to the current location registration process is registered as the last visited registered TAI of the location registration information data base 212 of the mobile terminal 100.

The transfer to the "TAI allocation process by neighbors" again after transfer to the "TAI allocation process by TA-traced ID list" was explained above with reference to FIGS. 7G and 8G. In this way, the travel route (TA-traced ID) of the mobile terminal 10 can be collected by switching between the "TAI allocation process by neighbors" and the "TAI allocation process by TA-traced ID list" as required. The use of the travel route can reduce the number of times the location registration process is executed by the mobile terminal 100.

Figure 9:
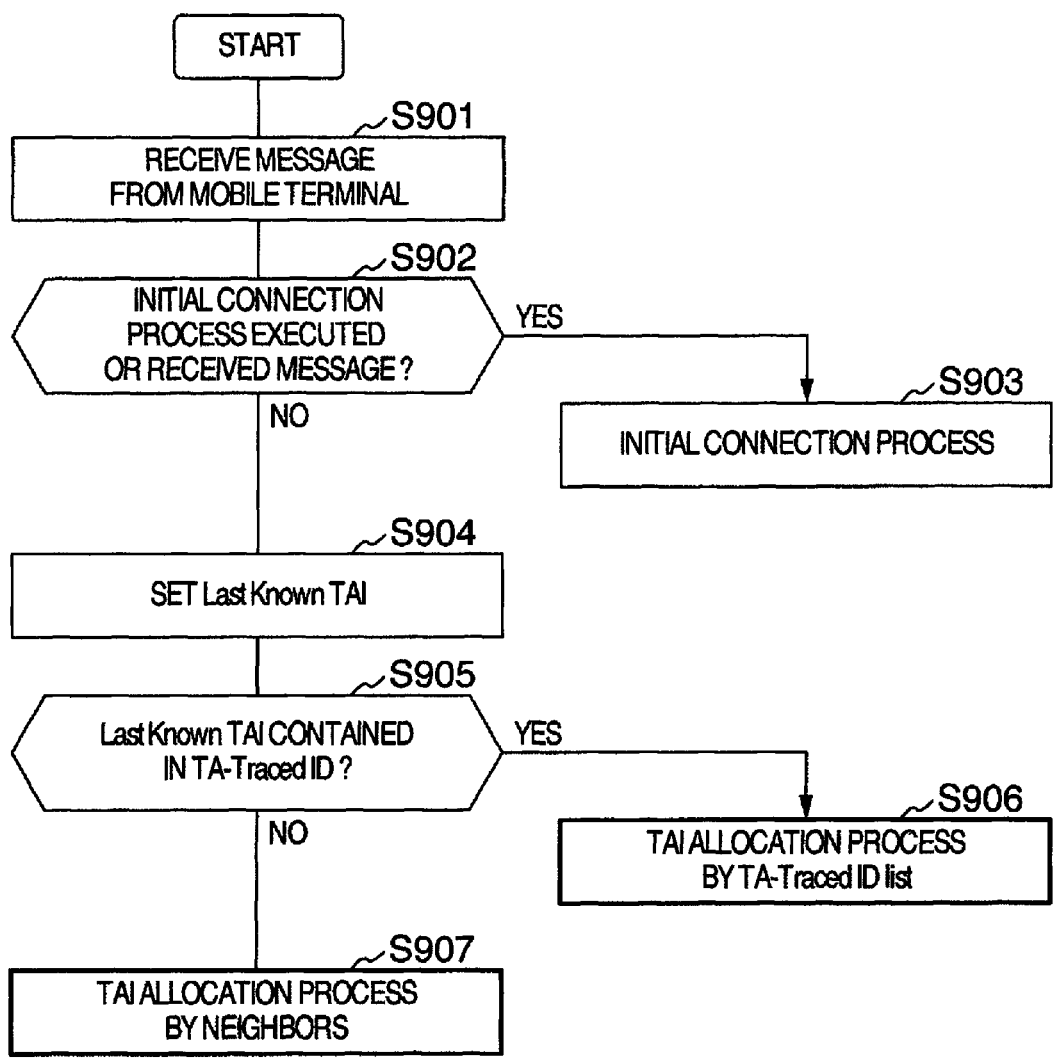
FIG. 9 is a flowchart showing the process executed by the call processing control unit.

FIG. 9 is a flowchart for explaining the process executed by the call processing control unit 102 to construct the TAI list.

The call processing control unit 102, upon reception of a message from the mobile terminal 100 (step 901), judges whether the particular message is "a message requesting the initial connection process" (step 902). In the case where the message is the one requesting the initial connection process, the TAI list allocation process for initial connection is executed (step 903).

In the case where a message requesting the location registration process is received, on the other hand, the TAI of the base station 101 which has relayed the location registration message from the mobile terminal 100 is set as the last known TAI (step 904).

The call processing control unit 102, in order to judge whether the mobile terminal 100 moves along the travel pattern determined by the call processing control unit 102, checks to see whether the last known TAI set in step 702 is contained in the TA-traced ID list in the location registration information data base 412 of the call processing control unit 102 (step 905).

In the case where the last known TAI is contained in the TA-traced ID list in the location registration information data base 412, the call processing control unit 102 executes the TAI allocation process by the TA-traced ID list (step 906). In this case, the call processing control unit 102 judges that the mobile terminal 100 moves along the travel pattern determined by the call processing control unit 102, and extracts TAIs from the TA-traced ID list indicating the travel route of the mobile terminal 100 thereby to construct the TAI list.

In the case where the last known TAI is not contained in the TA-traced ID list in the location registration information data base 412, on the other hand, the call processing control unit 102 executes the TAI list allocation process by neighbors (step 907). In this case, the call processing control unit 102, judging that the next TA to which the mobile terminal 100 may move cannot be predicted, constructs a TAI list based on the TAI of the base station currently associated with the mobile terminal 100 and the neighbor TAIs thereof.

Figure 10:
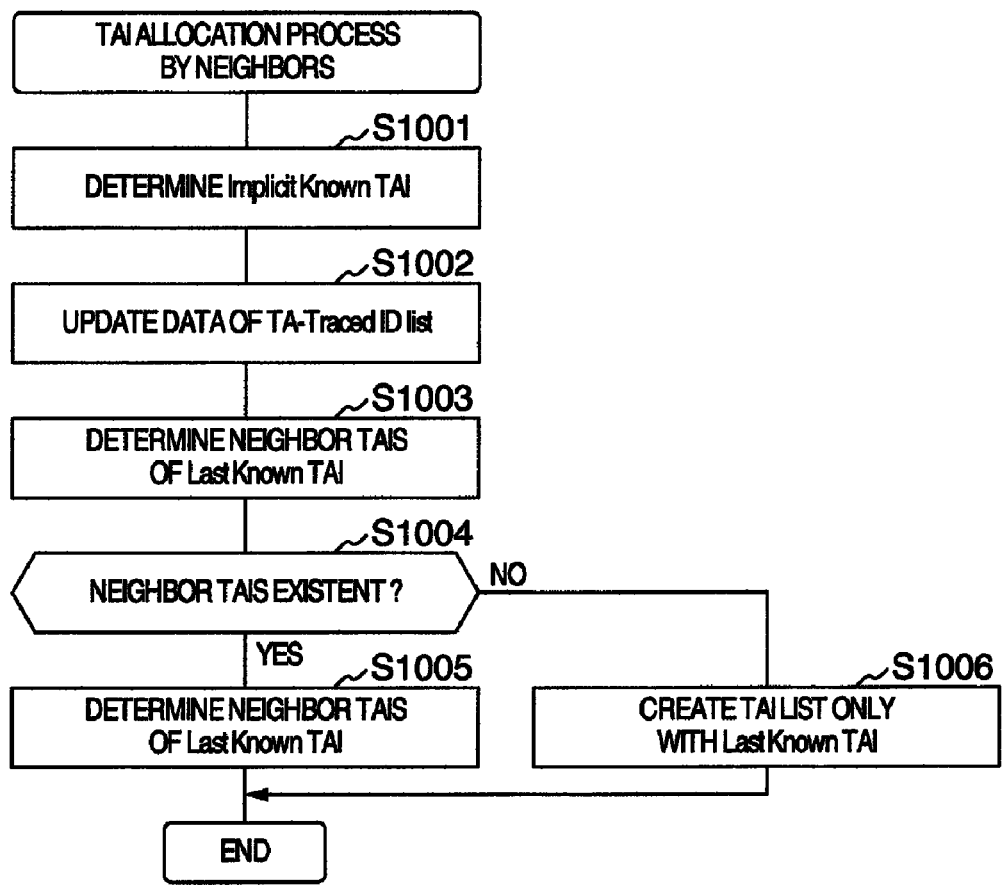
FIG. 10 is a flowchart showing the TAI list allocation process executed by the neighbor in the call processing control unit.

FIG. 10 is a flowchart for the TAI list allocation process by neighbors. In this process, the call processing control unit 102 records the travel route of the mobile terminal 100 while at the same time constructing a TAI list to be allocated to the mobile terminal 100 based on the neighbor TA information of the TAs of the location registration area 103 during the location registration started by the mobile terminal 100.

The call processing control unit 102 specifies any area in the TAI list adjoining the area of the last known TAI based on the information of the last known TAI and the last TAI list allocated to the mobile terminal 100, and sets the TAI of the particular area in the implicit known TAI field in the location registration information data base 412 as the implicit known TAI field (step 1001).

Also, the call processing control unit 102 sets the last visited registered TAI, the last known TAI and the implicit known TAI in the TA-traced ID list of the location registration information data base 412 (step 1002).

The call processing control unit 102 determines a neighbor TAI of the last known TAI (step 1003) and checks to see whether the neighbor TAI thus determined is existent in the base station information data base 414 (step 1004).

In the case where the neighbor TAI determined by the call processing control unit 102 exists in the base station information data base 414, the particular neighbor TAI is registered in the TAI list in the location registration information data base 412 (step 1005). In the absence of any neighbor TAI, on the other hand, the TAI list is created only with the last known TAI (step 1006).

Figure 11:
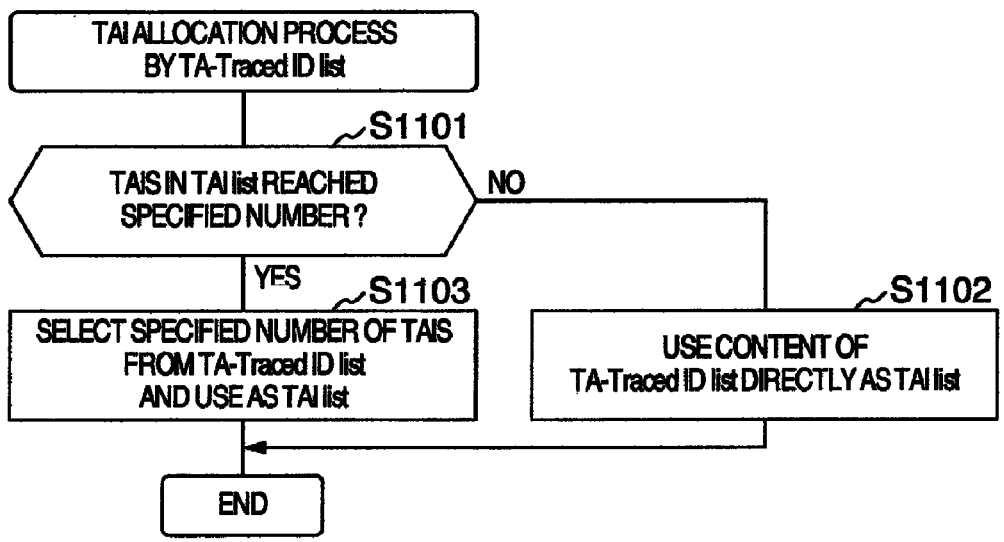
FIG. 11 is a flowchart showing the TAI list allocation process executed by the TA-traced ID list in the call processing control unit.

FIG. 11 is a flowchart for the TAI list allocation process with the TA-traced ID list. In this process, the TAI list to be allocated to the mobile terminal 100 is constructed by the call processing control unit 102 based on the mobile terminal route pattern information 100 held in the TA-traced ID list in the location registration information data base 412.

The call processing control unit 102 checks to see whether the number of TAIs in the registered TAI list has reached a maximum specified in 3GPP (3rd generation partnership project) 3GPP TS 24.301 V1.0.0 (step 1101).

In the case where the number of TAIs in the TAI list has yet to reach a maximum, the TAIs contained in the TA-traced ID list in the location registration information data base 412 are registered directly in the TAI list in the location registration information data base 412 (step 1102).

In the case where the number of TAIs in the TAI list has reached the maximum, on the other hand, the call processing control unit 102 selects 16 TAIs in the order of proximity to the TAI of the current base station from the TAIs included in the TA-traced ID list, and registers them in the TAI list in the location registration information data base 412 (step 1103).

In 3GPP (3rd generation partnership project) 3GPP TS 24.301 V1.0.0, the maximum number of TAIs that can be registered in the TAI list is specified as 16. Although the number of TAIs that can be registered in the TAI list is specified as 16 also in this embodiment, any number of TAIs not more than 16 can be registered without any problem.

In the process of steps 1101 to 1103, the continuously adjacent TAs centered on the TA of the last known TAI can be selected from the TA-traced ID list. By selecting continuously adjacent TAs, the location registration process executed by the mobile terminal 100 can be minimized. In a method of selecting the TAIs from the TA-traced ID list, the call processing control unit 102 manages also the update time information for the TAIs registered in the TA-traced ID list and selects the TAIs in chronological or reverse chronological order of updating.

After storing the TAIs in the TAI list through the process shown in FIGS. 9, 10 and 11, the call processing control unit 102 executes the TAI list allocation process for the mobile terminal 100 with a message 615 in response to the location registration message from the mobile terminal 100.

FIG. 12 is a diagram showing a case in which the number of TAIs in the TA-traced ID list exceeds a maximum that can be registered in the TAI list (the maximum tolerable number is set to 16 in the case under consideration).

As the result of the mobile terminal 100 moving through various places, TAIs 1, 2, 3, 4, 5, 8, 11, 12, 13, 15, 16, 17, 18, 20, 22, 23, 26, 27, 30, 31, 32 are registered in the TA-traced ID list.

Due to the problem of the storage capacity of the call processing control unit 102, the number of TAs that can be registered in the TAI list may be limited. In the case where the number of TAIs in the travel area list to be registered in the TAI list exceeds a specified number, therefore, the areas are entered in the travel area list in the order of proximity to the area included in the notification information.

In FIG. 12, the mobile terminal 100 has moved from TAI 27 to TAI 13, and therefore, the base station currently associated with the mobile terminal 100 is TAI 13. The call processing control unit 102 selects 16 TAIs from TAIs 1, 2, 3, 4, 5, 8, 11, 12, 13, 15, 16, 17, 18, 20, 22, 23, 26, 27, 30, 31, 32 in the order of proximity to TAI 13 of the base station currently associated with the mobile terminal 100 thereby to create the TAI list. As a result, the TAI list can be created by minimizing the number of times the location of the mobile terminal 100 is registered. Thus, the consumption of the wireless resources due to the location registration process can be suppressed.

The explanation of this embodiment assumes that one base station 101 exists in each TA of the location registration area. Nevertheless, the invention can be carried out for any number of the base stations 101 existing in each TA.

Also, according to this embodiment, the location registration process is executed on the assumption that one type of TAI is held in the base station 101. Nevertheless, the invention can be embodied without any problem by executing the location registration process using not the TAI but the cell ID in the base station configured of a plurality of cells.

Figure 13A:
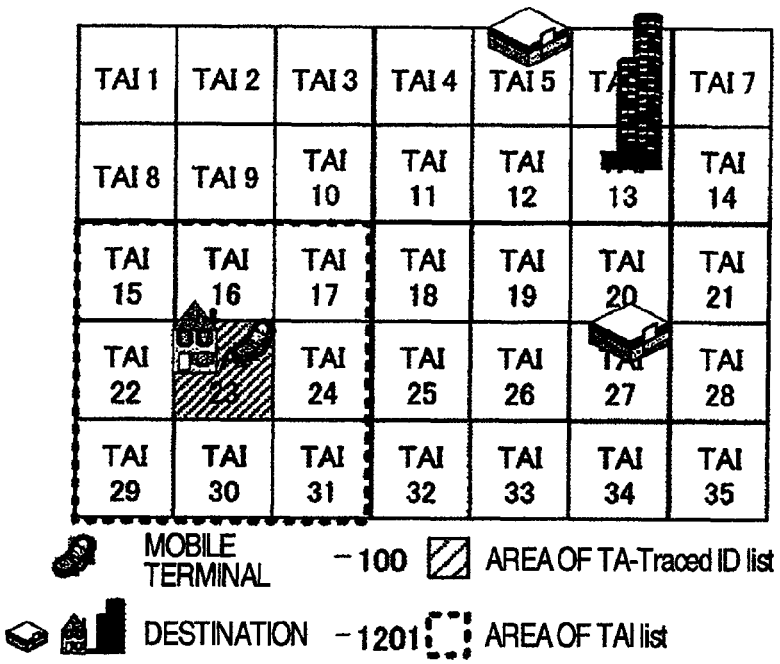
FIG. 13A is a diagram for explaining the setting of a primary paging area and a secondary paging area.
Figure 13B:
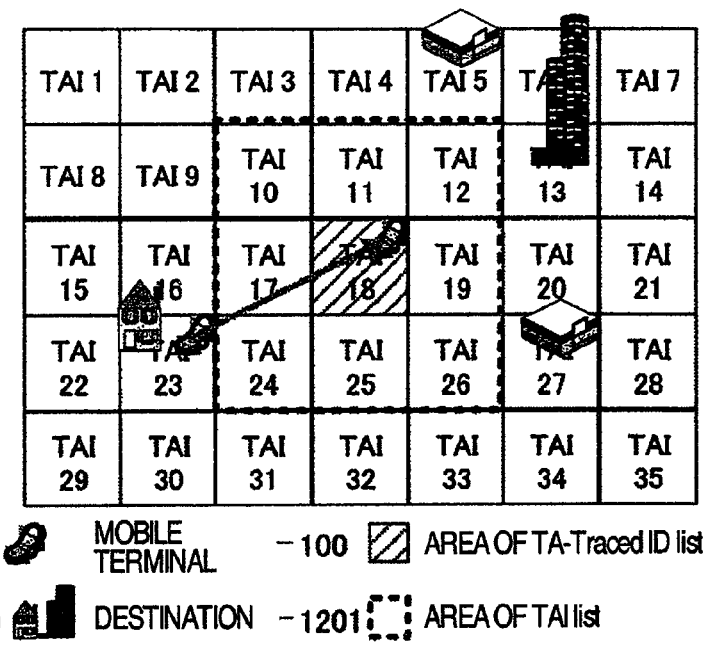
FIG. 13B is a diagram for explaining the setting of the primary paging area and the secondary paging area following the movement of the mobile terminal.
Figure 13C:
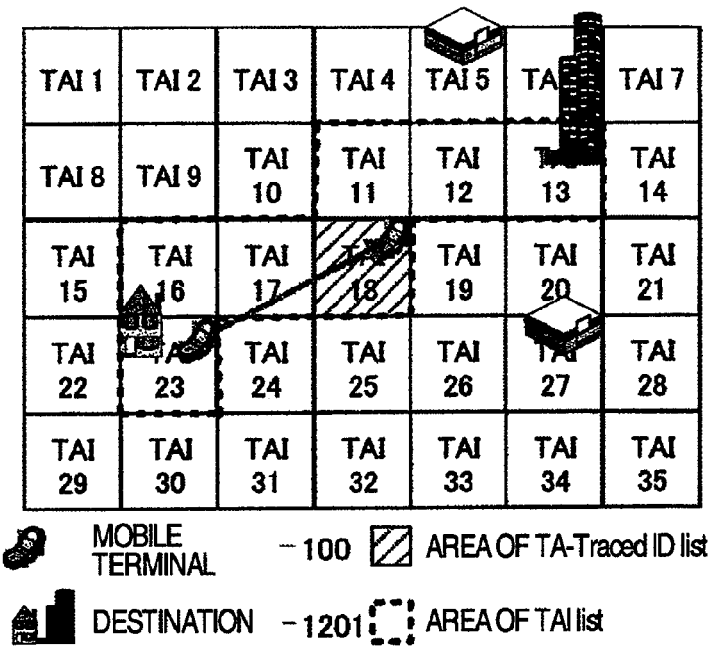
FIG. 13C is a diagram for explaining that the travel pattern of the mobile terminal is set in the secondary paging area.
Figure 14:
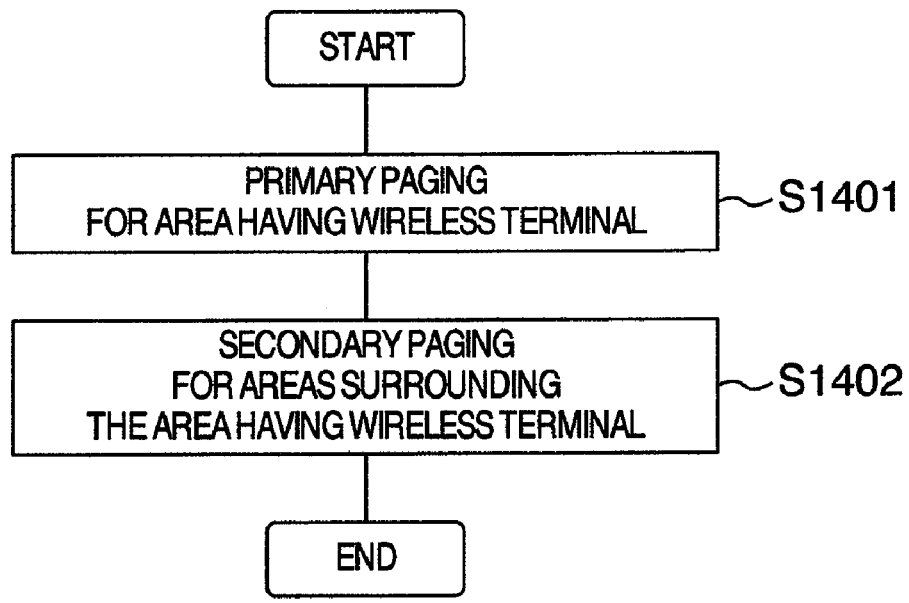
FIG. 14 is a flowchart showing the paging process in the case where the call processing control unit is unable to recognize the travel pattern of the mobile terminal.
Figure 15:
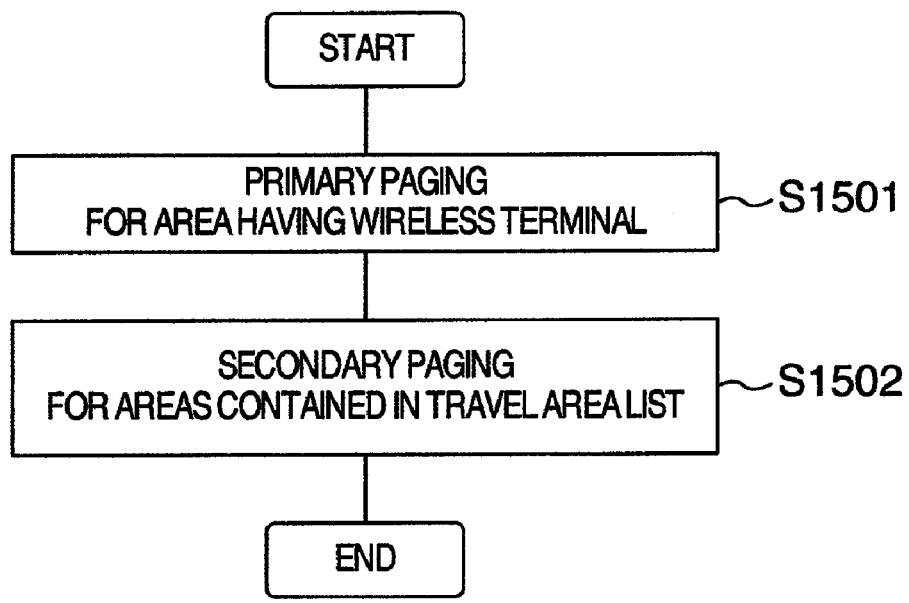
FIG. 15 is a flowchart showing the paging process in the case where the call processing control unit is able to recognize the travel pattern of the mobile terminal.

FIGS. 13A to 13C are diagrams for explaining the paging process according to this embodiment. FIG. 14 is a flowchart for explaining the paging process executed in the case where the call processing control unit 102 cannot recognize the travel pattern of the mobile terminal 100, and FIG. 15 a flowchart for explaining the paging process executed in the case where the call processing control unit 102 can recognize the travel pattern of the mobile terminal 100.

FIG. 13A shows how to determine the paging area in the case where the data terminates at the mobile terminal 100 in the state shown in FIG. 8A. The call processing control unit 102 requests the base station 101 included in TAI 23 registered in the last known TAI to execute the process of paging to the mobile terminal 100 (primary paging) (step 1401). In the case where the primary paging fails, the paging request is issued to the base station 101 contained in the TAIs (TAIs 15, 16, 17, 22, 24, 29, 30, 31) in the neighborhood of TAI 23 contained in the TAI list allocated to the mobile terminal 100 (secondary paging) (step 1402).

FIG. 13B shows how to determine the paging area in the case where the data terminates at the mobile terminal 100 in the state shown in FIG. 8B. The call processing control unit 102 requests the base station 101 included in TAI 18 registered in the last known TAI to execute the process of paging to the mobile terminal 100 (primary paging) (step 1401). In the case where the primary paging fails, the base station 101 included in the TAIs (TAIs 10, 11, 12, 17, 19, 24, 25, 26) in the neighborhood of TAI 23 in the TAI list allocated to the mobile terminal 100 is requested to issue the paging request (secondary paging) (step 1402).

As shown in FIGS. 13A and 13B, the paging area can be set stepwise by following the movement of the mobile terminal 100 utilizing the operation of updating the TAI list and the last known TAI registered in the call processing control unit 102 each time the mobile terminal 100 moves. Incidentally, though not explained here, the primary and secondary paging processes can be executed similarly also in the states shown in FIGS. 8C to 8E and 8G representing a case in which the TAIs of the TA corresponding to the current base station and the neighboring TAs are allocated to the mobile terminal 100 as a TAI list.

FIG. 13C shows how to determine the paging area in the case where the data terminates at the mobile terminal 100 in the state shown in FIG. 8F. As described above, the call processing control unit 102 grasps the movement of the mobile terminal 100 so that the travel pattern of the mobile terminal 100 is registered in the TAI list. The mobile terminal 100 is highly likely to exist in this TAI list, a request is given to the base station 101 included in TAI 18 registered in the last known TAI to execute the process of paging to the mobile terminal 100 (primary paging) (step 1501). In the case where the primary paging fails, a paging request is issued to the TAIs (TAIs 11, 12, 13, 16, 17, 23) constituting the travel pattern of the mobile terminal 100 (secondary paging) (step 1502). As a result, the paging area can be set stepwise along the travel pattern of the mobile terminal 100, thereby making it possible to determine the paging area. In this way, the consumption of the wireless resources is expected to be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system comprising a wireless terminal, a plurality of base stations communicating with the wireless terminal and a call processing control unit for controlling the plurality of the base stations;

wherein each of the base stations includes:

a notification information transmitter for transmitting the notification information containing the area having the base station;

wherein the wireless terminal includes:

a storage unit for storing, by receiving from the call processing control unit through the base station, a location registration area list configured of a plurality of location registration areas, and a controller, which upon reception of the notification information from the base station, judges whether the area contained in the notification information is contained in the location registration area list stored in the storage unit, and in the case where the particular area is not so included, sends a location registration request to the call processing control unit through the base station; and wherein the call processing control unit includes:

a location registration area list creator for creating a new location registration area list based on the area having the wireless terminal which has sent the location registration request and the neighboring areas, a storage unit for storing the location registration area list created by the location registration area list creator, a controller which upon reception of the location registration request from the wireless terminal, sends the location registration area list created by the location registration area list creator to the wireless terminal through the base station, and a paging processor for executing the paging process based on the location registration area list sent to the wireless terminal.

2. The wireless communication system according to claim 1, wherein the paging processor of the call processing control unit executes the primary paging process for the area having the wireless terminal which has sent the location registration request.

3. The wireless communication system according to claim 2,
wherein the paging processor of the call processing control unit executes the secondary paging process for the areas in the neighborhood of the area having the wireless terminal which has sent the location registration request.

4. The wireless communication system according to claim 1,
wherein the call processing control unit includes a travel area list creator for creating a travel area list for the wireless terminal by estimating the areas located on the travel route of the wireless terminal based on the areas included in the received location registration request and the areas included in the newly received location registration request; and
wherein the controller of the call processing control unit, upon reception of the location registration request from the wireless terminal, judges whether the area having the wireless terminal which has sent the location registration request is included in the travel area list stored in the storage unit, and in the case where the particular area is not so included, sends the location registration area request created by the location registration area list creator to the wireless terminal through the base station, while in the case where the particular area is so included, the controller sends the content of the travel area list created by the travel area list creator to the wireless terminal through the base station as a location registration area list.

5. The wireless communication system according to claim 4,
wherein the paging processor of the call processing control unit, at the time of sending the content of the travel area list as a location registration area list to the wireless terminal through the base station, executes the primary paging process for the area having the wireless terminal which has sent the location registration request.

6. The wireless communication system according to claim 5,
wherein the paging processor of the call processing control unit, at the time of sending the content of the travel area list as a location registration area list to the wireless terminal through the base station, executes the primary paging process for the areas included in the travel area list.

7. The wireless communication system according to claim 4,
wherein the travel list creator of the call processing control unit, in the case where the number of the areas stored in the travel area list exceed a specified value, causes the areas to be entered in the travel area list in the order of proximity to the area having the wireless terminal which has sent the location registration request.

8. The wireless communication system according to claim 1,
wherein the location registration area list creator of the call processing control unit causes the location registration area list not to include those areas in the neighborhood of the mobile terminal having sent the location registration request which have no base station.

* * * * *